(12) United States Patent
Marya et al.

(10) Patent No.: US 10,233,934 B2
(45) Date of Patent: Mar. 19, 2019

(54) FRACTURE-RESISTANT SELF-LUBRICATING WEAR SURFACES

(71) Applicant: Schlumberger Technology Corporation, Sugar Land, TX (US)

(72) Inventors: Manuel P. Marya, Sugar Land, TX (US); Raghu Madhavan, Sugar Land, TX (US); Indranil Roy, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 399 days.

(21) Appl. No.: 14/909,289

(22) PCT Filed: Aug. 3, 2014

(86) PCT No.: PCT/US2014/049513
§ 371 (c)(1),
(2) Date: Feb. 1, 2016

(87) PCT Pub. No.: WO2015/020916
PCT Pub. Date: Feb. 12, 2015

(65) Prior Publication Data
US 2016/0177959 A1    Jun. 23, 2016

Related U.S. Application Data

(60) Provisional application No. 61/861,978, filed on Aug. 3, 2013.

(51) Int. Cl.
*C25D 7/10* (2006.01)
*F04D 13/08* (2006.01)
(Continued)

(52) U.S. Cl.
CPC ........ *F04D 29/026* (2013.01); *C10M 103/04* (2013.01); *C25D 7/10* (2013.01);
(Continued)

(58) Field of Classification Search
CPC .... F04D 29/023; F04D 29/063; F04D 29/056; F04D 29/5853; F04D 29/026;
(Continued)

(56) References Cited

U.S. PATENT DOCUMENTS 6,814,927 B2 * 11/2004 Liao .................. C22C 1/051
148/212
7,521,128 B2 * 4/2009 Schuh .................. C25D 3/56
428/546

(Continued)

FOREIGN PATENT DOCUMENTS

CN        104231498 A  * 12/2014

OTHER PUBLICATIONS

Tjong, S.C. and Chen, Haydn. "Nanocrystalline materials and coatings" Materials Science and Engineering R 45 (2004) 1-88. Aug. 10, 2004.*

(Continued)

*Primary Examiner* — Igor Kershteyn
*Assistant Examiner* — Topaz L. Elliott

(57) ABSTRACT

Fracture-resistant and self-lubricating wear surfaces are provided. In an implementation, a machine surface that is subject to wear is coated with or is constructed of a metallic nanostructure to resist the wear and to provide fracture-resistant hardness, built-in lubrication, and thermal conductivity for heat-sinking friction. The metallic nanostructured surface may be used, for example, on a face seal, bushing, bearing, thrust member, or hydraulic flow passage of an electric submersible pump. In an implementation, the metallic nanostructured surface is a nanocrystalline alloy includ- (Continued)

ing nanograin twins of a body-centered cubic (BCC), face-centered cubic (FCC), or hexagonal closest packed (HCP) metal. The nanostructured alloy may include atoms of copper, silver, gold, iron, nickel, palladium, platinum, rhodium, beryllium, magnesium, titanium, zirconium, or cobalt, and may provide more hardness and lubricity than diamond-like carbon coatings or carbides.

30 Claims, 23 Drawing Sheets

(51) Int. Cl.
<table>
<tr><td>F04D 29/02</td><td>(2006.01)</td></tr>
<tr><td>F04D 29/06</td><td>(2006.01)</td></tr>
<tr><td>F04D 29/58</td><td>(2006.01)</td></tr>
<tr><td>F16C 33/12</td><td>(2006.01)</td></tr>
<tr><td>C10M 103/04</td><td>(2006.01)</td></tr>
<tr><td>F04D 29/056</td><td>(2006.01)</td></tr>
<tr><td>F04D 1/00</td><td>(2006.01)</td></tr>
<tr><td>F04D 13/10</td><td>(2006.01)</td></tr>
<tr><td>F04D 29/16</td><td>(2006.01)</td></tr>
<tr><td>F04D 29/047</td><td>(2006.01)</td></tr>
</table>

(52) U.S. Cl.
CPC ............... *F04D 1/00* (2013.01); *F04D 13/08* (2013.01); *F04D 13/10* (2013.01); *F04D 29/0473* (2013.01); *F04D 29/056* (2013.01); *F04D 29/061* (2013.01); *F04D 29/167* (2013.01); *F04D 29/5893* (2013.01); *F16C 33/121* (2013.01); *F05B 2280/2006* (2013.01); *F05B 2280/20082* (2013.01); *F05D 2300/10* (2013.01); *F05D 2300/17* (2013.01); *F05D 2300/20* (2013.01); *F05D 2300/608* (2013.01); *F16C 2204/10* (2013.01); *F16C 2204/34* (2013.01); *F16C 2204/52* (2013.01); *F16C 2204/80* (2013.01); *F16C 2223/70* (2013.01)

(58) Field of Classification Search
CPC ...... F04D 29/167; F04D 29/0473; F04D 1/00; F04D 13/08; F04D 13/10; C10M 103/04; C25D 7/10; F05D 2300/608; F05D 2300/10; F05D 2300/20; F05D 2300/17; F16C 33/12–33/25; F16C 2240/64; B22F 1/0018; B22F 2001/0037
USPC .......................................................... 384/42
See application file for complete search history.

(56) References Cited

U.S. PATENT DOCUMENTS

<table>
<tr><td>7,585,349 B2 *</td><td>9/2009</td><td>Xia ........................ B22F 1/0007<br>75/371</td></tr>
<tr><td>8,541,349 B2 *</td><td>9/2013</td><td>Xiao ........................ C23C 4/06<br>106/287.35</td></tr>
<tr><td>8,602,113 B2 *</td><td>12/2013</td><td>Jin ........................ E21B 17/042<br>166/242.4</td></tr>
<tr><td>8,684,679 B2 *</td><td>4/2014</td><td>Tetzlaff ................... F04D 13/08<br>415/170.1</td></tr>
<tr><td>2006/0021878 A1 *</td><td>2/2006</td><td>Lu .............................. C22C 1/00<br>205/104</td></tr>
<tr><td>2007/0142547 A1</td><td>6/2007</td><td>Vaidya et al.</td></tr>
<tr><td>2007/0228664 A1 *</td><td>10/2007</td><td>Anand ................. F16J 15/3412<br>277/399</td></tr>
<tr><td>2009/0155479 A1</td><td>6/2009</td><td>Xiao et al.</td></tr>
<tr><td>2009/0253227 A1</td><td>10/2009</td><td>Defries et al.</td></tr>
<tr><td>2012/0043213 A1 *</td><td>2/2012</td><td>Lund ...................... C25D 21/12<br>205/81</td></tr>
<tr><td>2012/0082783 A1 *</td><td>4/2012</td><td>Barnett ................. B22F 1/0018<br>427/142</td></tr>
<tr><td>2012/0287427 A1</td><td>11/2012</td><td>Li et al.</td></tr>
<tr><td>2013/0171367 A1 *</td><td>7/2013</td><td>Kusinski ............... B05D 5/083<br>427/447</td></tr>
</table>

OTHER PUBLICATIONS

International Search Report and Written opinion dated Nov. 18, 2014 for International patent Application No. PCT/US2014/049513, filed on Aug. 3, 2014, 18 pages.

* cited by examiner

FRACTURE-RESISTANT SELF-LUBRICATING WEAR SURFACES

RELATED APPLICATIONS

This patent application claims the benefit of priority to U.S. Provisional Patent No. 61/861,978 to Marya et al., filed Aug. 3, 2014 and incorporated by reference herein in its entirety.

BACKGROUND

Abrasives, such as sand and particulates, are often present during oil production and result in abrasive well fluid to the detriment of the seals, bushings, bearings, and valves used in pumping equipment. Conventionally, several types of surface layers, coatings, platings, and treatments exist that increase the durability of the base material used in the construction of an electric submersible pump (ESP) component. ESPs have conventionally used boronizing on pump stages to increase wear resistance. Or, the conventional ESP component may use a solid piece of material that has desirable wear properties (e.g., silicon carbide: SiC). Conventionally, only a handful of known materials are suitable for creating durable seal faces with minimal leakage. Among various seal requirements, the conventional seal gap must implement a lubricating film to meet the challenge of friction, heat, and wear under heavy loads and high velocities. Desirable seal face materials have the following characteristics: low friction, high hardness, good wear resistance, corrosion resistance, and high heat conductivity. The list of conventional materials that can provide the right characteristics for a face seal is short: silicon carbide (SiC), ceramic $Al_2O_3$, carbon (diamond, diamond-like carbon, graphite as lubricant), tungsten carbide, cast iron, and nickel cast iron. SiC is one of the hardest, has high elastic modulus, and good thermal properties (heat conductivity and thermal resistance while undergoing limited thermal expansion). In the very best conventional face seals, diamond coatings are occasionally applied. Different variants of diamond-like carbon (DLC) coatings can be made, ranging in hardness and thickness. No conventional metallic materials are comparable to SiC ceramics, and no conventional coatings are known to be as effective as DLCs. When very hard, conventional wear materials also tend to inherit a brittle behavior.

BRIEF DESCRIPTION OF THE DRAWINGS

For this discussion, the devices and systems illustrated in the figures are shown as having a multiplicity of components. Various implementations of devices and systems, as described herein, may include fewer components and remain within the scope of the disclosure. Alternately, other implementations of devices and systems may include additional components, or various combinations of the described components, and remain within the scope of the disclosure.

DETAILED DESCRIPTION

Overview

This disclosure describes fracture-resistant self-lubricating wear surfaces. In an implementation, fracture resisting and self-lubricating surfaces or surface enhancements that are made of metallic nanostructures are applied to high-wear face seals, bushings, and bearing surfaces associated with rotating shafts, and high wear surfaces such as thrust washers and hydraulic flow passages of electric submersible pumps (ESPs). The strong, ultra-hard, and self-lubricating nanostructure surfaces described herein can exceed the benefits of silicon carbide (SiC) surfaces and diamond-likecarbon coatings (DLC coatings), and are useful for the wear surfaces in ESPs used in oilfield and well applications, and in many other applications.

Figure 1:
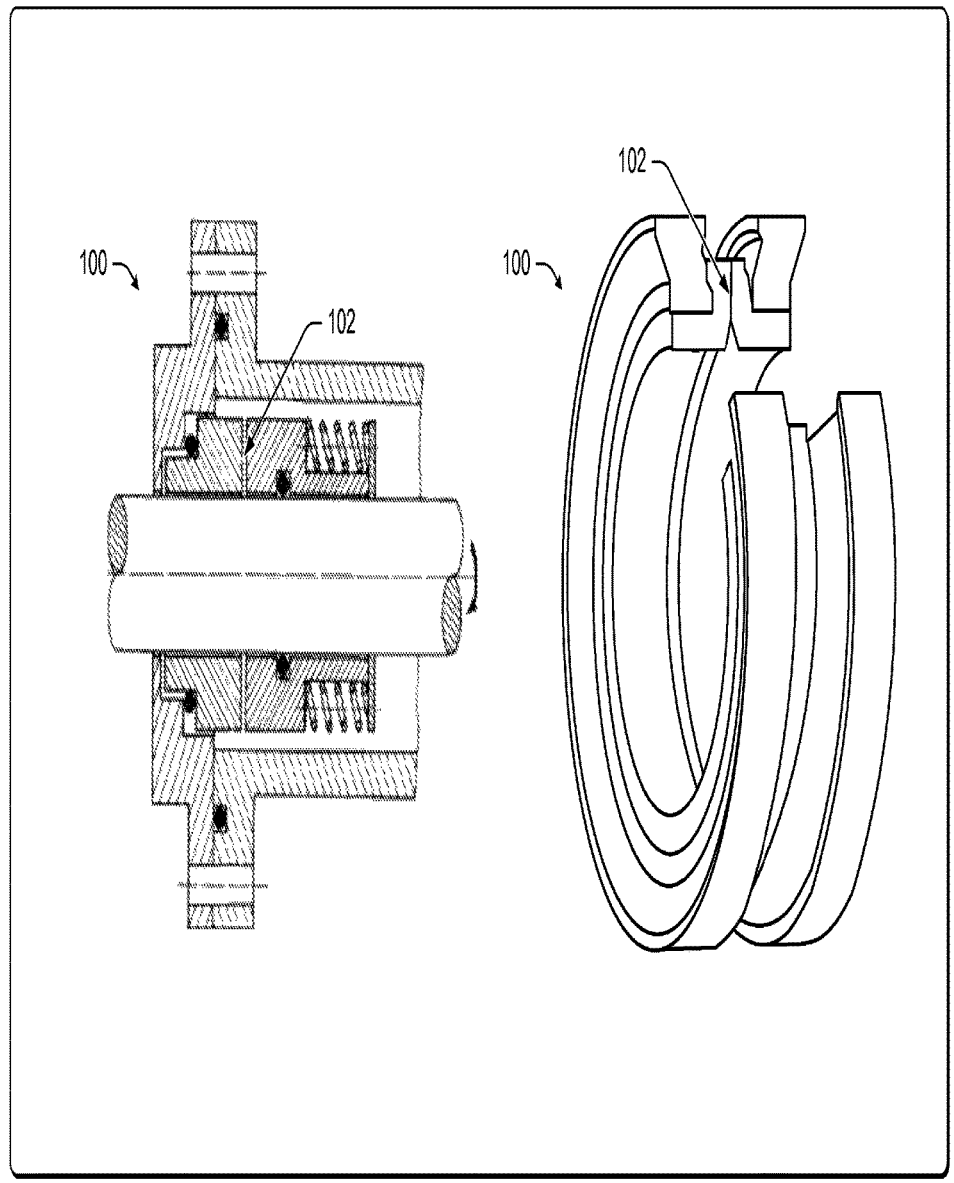
FIG. 1 is a diagram of an example rotating shaft face seal with a metallic nanostructured wear surface.

FIG. 1 shows examples of a rotating shaft face seal 100. Example metallic nanostructured surfaces 102 and associated systems, materials, coatings, surface treatments, processes, and methods described herein expand the operational limits, reliability, and durability of rotating shaft face seals 100, bushings, and bearings. An example system uses ultra-hard and strong metallic nanomaterials, produced or deposited on ceramics like SiC materials via a variety of processes to create a superior wear surface. An example surface system may also use special material chemistries and surface patterning techniques to create oleophilic and/or hydrophobic slick surfaces. For hardness and lubricity, some implementations of the example metallic nanostructured surfaces 102 supersede conventional state-of-the-art seal surfaces, for example conventional ceramic surfaces with diamond-deposited layers and others in Table (1) below:

convert to a symmetric crystalline form. When icosahedral clusters get sufficiently large, the atoms beneath each of the twenty facets adopt a face-centered-cubic (FCC) pyramidal arrangement with tetrahedral (111) facets. Metal nanoparticles that have nucleated by evaporation onto surfaces foster icosahedral-twinning.

In an implementation, an example face seal, bushing, or bearing has at least a surface in contact with a rotating part (e.g., a shaft for transmitting power) thus creating friction, heat, and wear, but has a surface that is deposited, coated, or layered with a full or partial nanostructure characterized by high hardness, lubricity, and favorable thermal conduction characteristics.

The example metallic nanostructured surface (e.g., of a face seal) may have a treated surface that is, for example, a micron thick, a millimeter thick, or a centimeter thick, or in some cases the nanostructured thickness essentially replaces an entire component, such as a face seal member.

TABLE (1)

| PROPERTIES | THERMAL CONDUCTIVITY K BTU/HR-FT-° F. | THERMAL EXPANSION COEFFICIENT α × 10⁶ in\in ° F. | ELASTIC MODULUS E MPSI | DENSITY ρ LBM/IN³ | HARDNESS H | TEMP. LIMIT ° F. |
|---|---|---|---|---|---|---|
| CARBON GRAPHITE | 8.6 | 2.7 | 3.5 | 0.066 | 95 SCLEROSCOPE C | 500 |
| 85% AL₂O₃ CERAMIC | 8.7 | 2.9 | 32 | 0.123 | 75 ROCKWELL N | 350 |
| SILICON CARBIDE | 75 | 2.8 | 55 | 0.111 | 1900 KNOOP | |
| TUNGSTEN CARBIDE | 58 | 2.4 | 94 | 0.54 | 92 ROCKWELL A | 750 |
| CAST IRON | 26 | 7.2 | 16-20 | 0.26 | 235 BRINELL | |
| NICKEL CAST IRON | 23 | 10.7 | 0.26 | 0.264 | 120-170 BRINELL | 350 |

Example Surface Embodiments

In an implementation, a hard and self-lubricating surface for face seals 100 and other high-wear surfaces is constructed of a metallic nanostructure 102. For starting materials, metallic elements that have good thermal properties and good lubricity include copper, gold, silver, and others. These materials are inherently soft, have little inherent structural strength in their pure form, and conventionally are not suitable for face seal and other high-wear applications, unless produced with the characteristics to be described herein.

In an implementation, an example surface for increased wear and self-lubrication includes a metallic nanomaterial coating 102, treatment, or layer. A nanostructure is a structure of intermediate size between microscopic-size structure and molecular-size structure. Nanostructural detail has dimensions on the nanoscale. Certain nanomaterials exhibit a degree of fracture resistance that makes them suitable for face-seal applications because of a high concentration per unit surface area of faces and interfaces arising from the presence on the surface of nanostructured grains and substructures, such as "twins" (hereinafter referred to as nano-twins, twin structures, icosahedral-twins, or just twins). An icosahedral-twin, for example, is a twenty-face cluster composed of ten interlinked dual-tetrahedron crystals joined along triangular (cubic-111) faces that possess a three-fold symmetry. Nanostructures of metal atoms may assume icosahedral form on size scales where surface forces eclipse those from the bulk. A twinned-form of such nanostructures can be found in face-centered-cubic (FCC) metal atom clusters larger than ten nanometers (hereinafter "nm") in diameter. This may occur when the building-blocks beneath each of the 20 facets of an initially icosahedral cluster The example metallic nanostructured surface may be created by a metallic deposition process, such as sputtering, plating, electrolysis, or electroplating, which results in the deposition of a metallic nanocrystalline material. An example face seal or other component possessing the example nanostructured surface may have a deposited alloy with a high surface area concentration of twins in order to create high hardness. The deposition may include face-centered cubic (FCC) metals or alloys of copper, silver, gold, nickel, palladium, platinum, rhodium; hexagonal closest-packed (HCP) metals; and alloys of cobalt.

Figure 2:
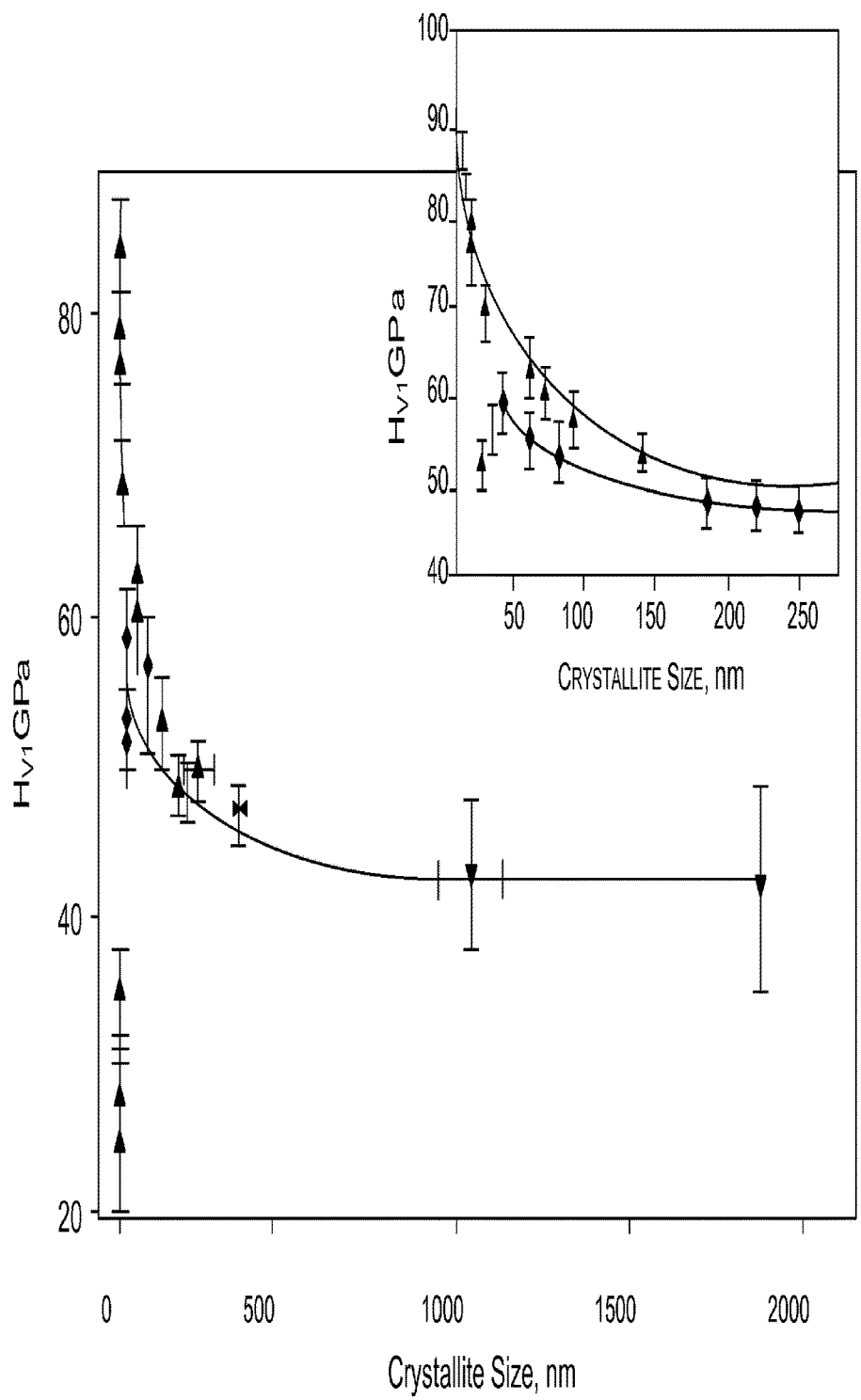
FIG. 2 is a diagram showing hardness versus grain size for an example wear surface with nanoscale grains providing high hardness.

FIG. 2 shows hardness versus grain size for an example wear surface, wherein the nanoscale size of grains provides much higher hardness than conventional surface materials.

Figure 3:
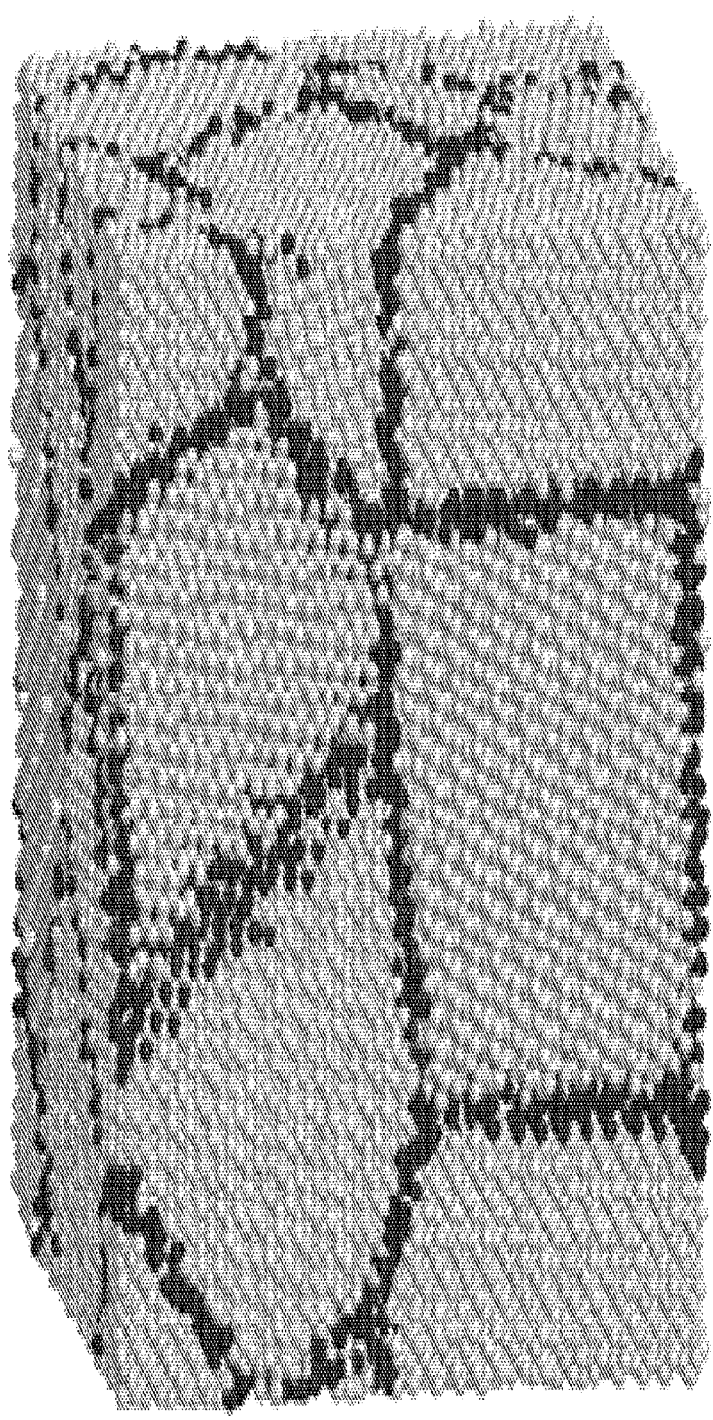
FIG. 3 is a diagram showing an example nanograin structure (schematic) with internal atomic layers.

FIG. 3 shows an example nanograin structure (schematic) with internal atomic layers.

Figure 4:
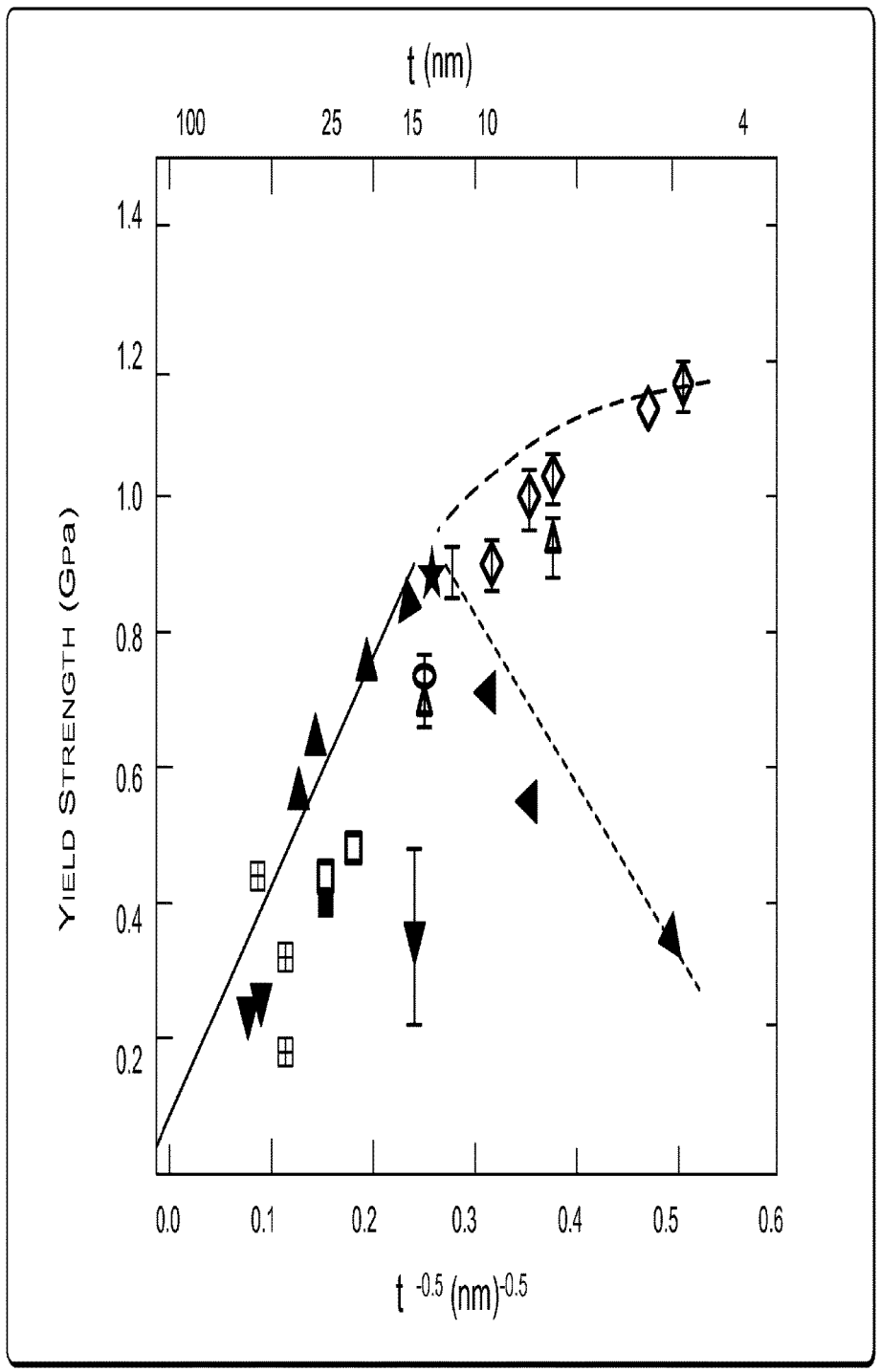
FIG. 4 is a diagram showing example yield strength of pure copper with respect to the spacing of twin structures on a surface, in a nanometer range.

FIG. 4 shows example yield strength of pure copper with respect to the spacing of twin structures on a surface, in a nanometer range. The finer the twins, the harder and stronger the material, thereby enabling improved wear resistance. This is because, in a nano-twinned structure, adjacent atoms share a common boundary, like adjacent rooms sharing a wall.

Figure 5:
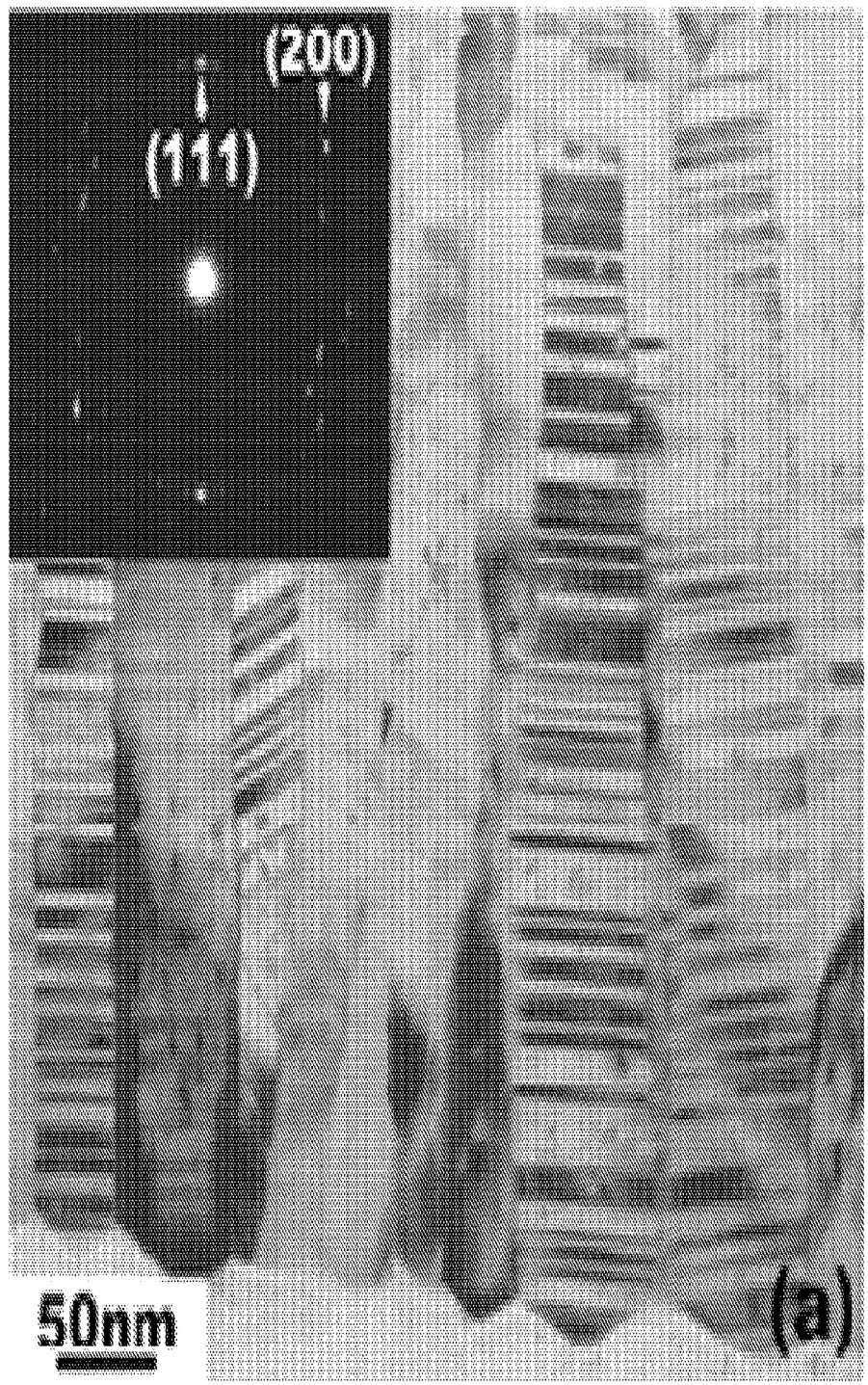
FIG. 5 is a transmission micrograph of a twin structure in pure copper.

FIG. 5 shows a transmission micrograph of a twin structure in pure copper. In order to make a crystal structure harder, the volume of the crystal particles becomes smaller. At the scale of approximately 10 nm, however, the effect of the intrinsic defects of the crystal structure almost offsets the compact structure stability and begins to weaken the overall structure. But nano-twins can enhance the structural strength, as for example in boron nitride, which can achieve strength of stability at the scale of approximately 4 nm. Crystal structure thus obtained at high temperatures also remains stable. Thus, nano-twinned cubic boron nitride structure has excellent thermal stability, chemical stability, and hardness, and its hardness is even comparable to diamond, which makes the nano-twinned cubic boron nitride structure desirable for such industrial applications.

In an implementation, the example surface possessing a nanostructured deposit is an alloy of, for example, copper, nickel, or tin, specifically designed to have an ultra-low friction coefficient. This creates a nanostructured surface, but with properties similar to TOUGHMET, an alloy known for its ultra-low friction coefficient (Materion Corporation, Mayfield Heights, Ohio).

The example material deposited as a nanostructured coating or treatment may include nickel, cobalt, or iron as a main chemical element complemented by one of several alloying elements such as silicon, molybdenum and/or tungsten (for example, as a disulfide former), lead, tin, indium, silver, and carbon (as a graphite former, or graphene, for example).

The example nanostructure deposit may be partially crystalline, partially amorphous and may be characterized as a metallic glassy alloy (thus usually with very complex chemistry) or a diamond-like carbon (DLC) coating with various fractions of sp2 and sp3 (hybridized orbital) bonds.

Figure 6:
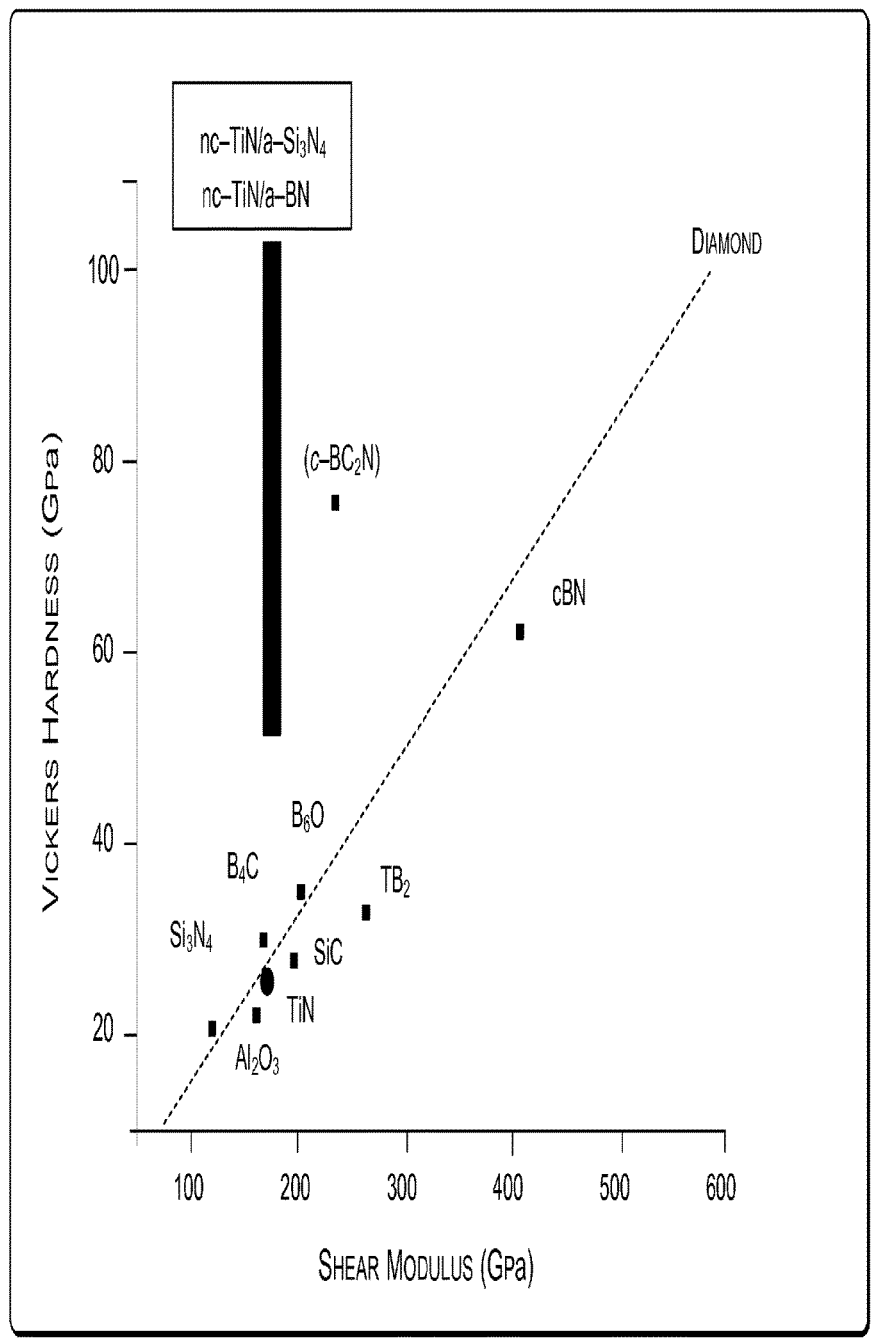
FIG. 6 is a diagram showing hardness of various materials that may be mixed in with a metallic nanostructured surface for hardness.

FIG. 6 shows hardness of various materials (not in nano form, but conventional materials commercially available). The example nanostructure deposit may include nanostructured, including twinned, cBN and hBN (i.e., boron nitride in cubic or hexagonal form, respectively) among other ceramic-type materials, such as those shown in FIG. 6, that ideally approach the hardness of diamond for wear resistance.

Figure 7:
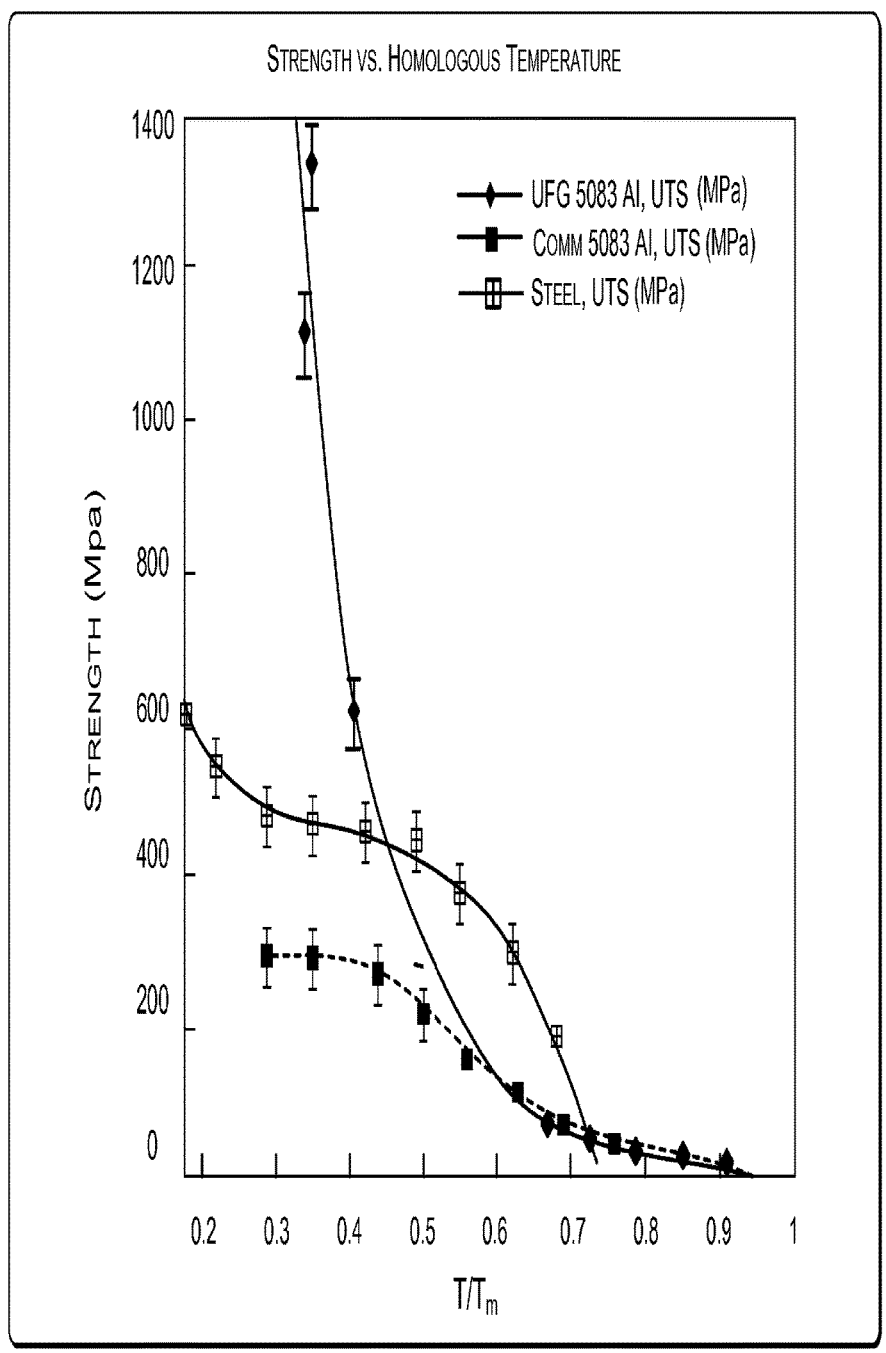
FIG. 7 is a diagram showing a comparison of ultra-fine-grained (UFG) aluminum 5083 with conventional 5083 aluminum and conventional steel.

The example nanostructured surface deposit may exhibit a structure consisting of nano-size grains decorated with atomic layer-thick ceramics, for example aluminum nitride surrounding nano-size grain aluminum, with an end goal of enhancing structural stability at temperature. FIG. 7, for example, shows a comparison of ultra-fine-grained (UFG) aluminum 5083 with conventional 5083 aluminum and conventional steel. Aluminum 5083 is an aluminum alloy with magnesium and traces of manganese and chromium that is highly resistant to attack by seawater and industrial chemicals. Alloy 5083 retains exceptional strength after welding. It has the highest strength of the non-heat treatable alloys, but is not recommended for use in temperatures in excess of 65° C. FIG. 7 demonstrates enhanced thermal stability of ultra-fine-grained aluminum 5083, especially in the range from 0.4 to 0.5 of the homologous melting temperature ratio.

The example nanostructured surface deposit or coating may have a liquid lubricant and/or a solid lubricant infused. For example, molybdenum disulfide ($MoS_2$), tungsten disulfide ($WS_2$), hexagonal-boron nitride (hBN), graphite, diamond, graphene, etc., of nanosize may be infused. The example nanostructured deposit or coating may be hydrophobic and/or oleophilic to enhance lubricity and improve water-sealing performance.

Figure 8:
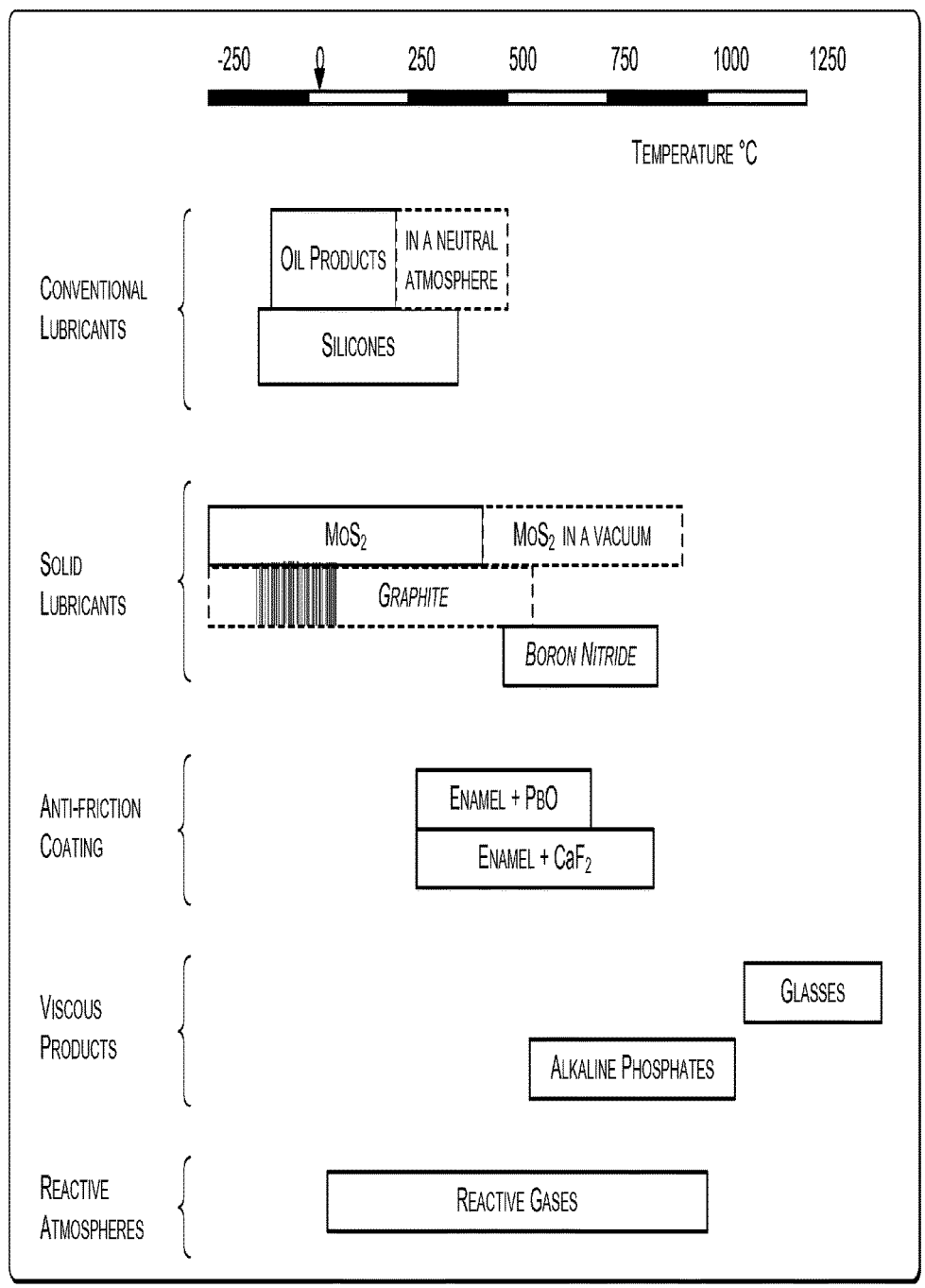
FIG. 8 is a diagram showing service temperatures of various lubricants that may be used with or infused into an example metallic nanostructured surface.

FIG. 8 shows the service temperatures of various lubricants that may be used with or infused into an example nanostructured surface.

Figure 9:
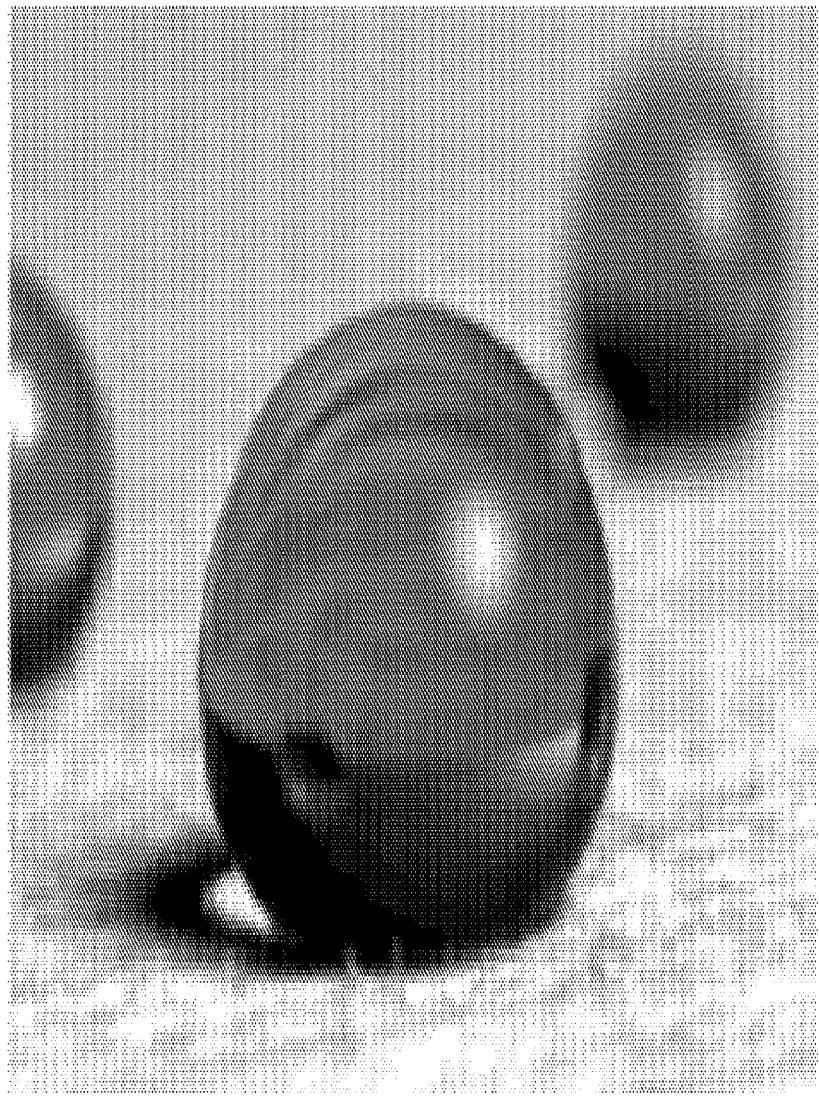
FIG. 9 is a diagram showing an example hydrophobic (or oleophobic) surface.

FIG. 9 shows an example hydrophobic (or oleophobic) surface (e.g., that does not promote the wetting of the nanostructured surface by droplets of the water (or the oil).

Figure 10:
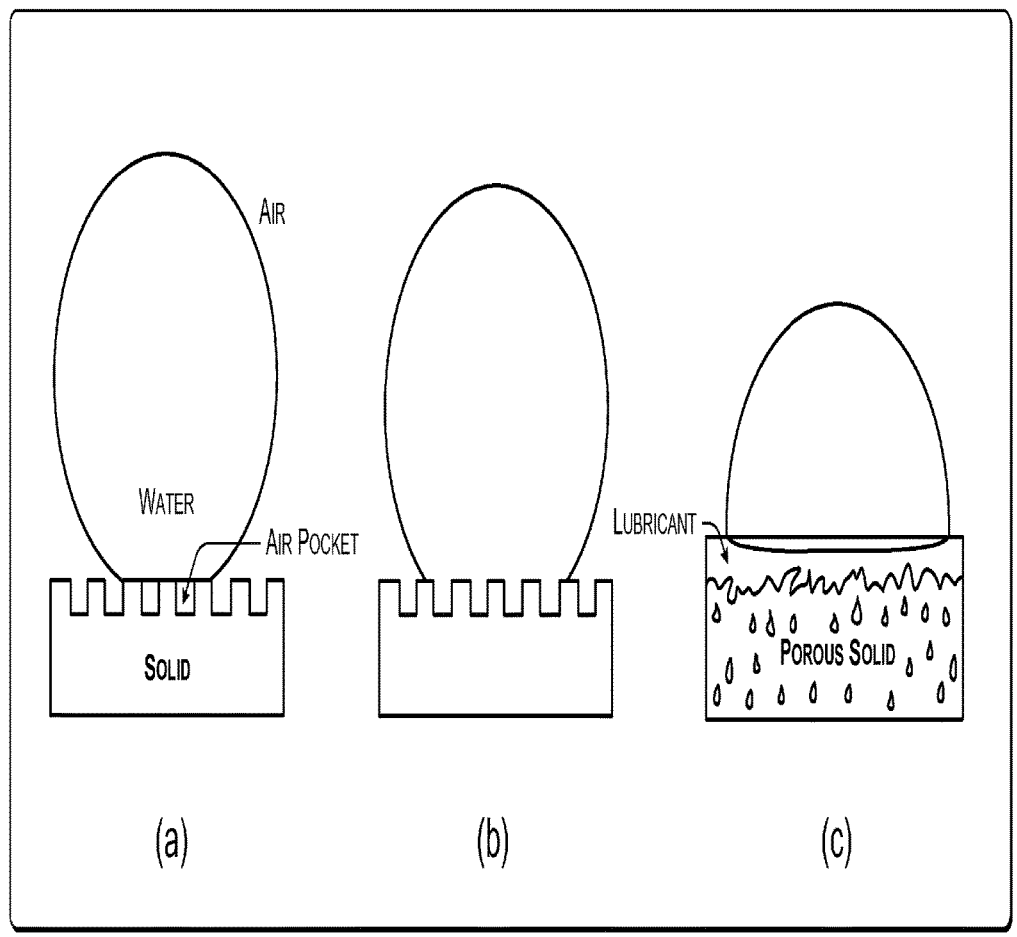
FIG. 10 is a diagram showing surface texturization on a nanoscale.

The example nanostructured surface or coating may have a surface chemical affinity (e.g., hydrophobicity, oleophilicity) determined by surface texturization on a nanoscale level, as shown in FIG. 10. FIG. 10(a) shows a Cassie-Baxter model of surface wetting, which proposes that water droplets sitting on rough surfaces form a solid-air-water interface. Air pockets trapped beneath the droplet reduce the contact between the water and the surface. If the surface features are of the right size and are regular, then the surface becomes water repellent. FIG. 10(b) shows the Wenzel model, in which no air pockets form, and so the surface is completely wetted by the droplet. FIG. 10(c) shows porous materials according to Wong et al., which have porous materials infused with, and wetted by, a liquid lubricant that repels water and oils. The surface features do not themselves generate water repellence, but serve to hold the lubricant in place. (See for example, Materials Science, "Slippery When Wetted," Michael Nosonovsky, Nature, 477, 412-413 (22 Sep. 2011).

Figure 11:
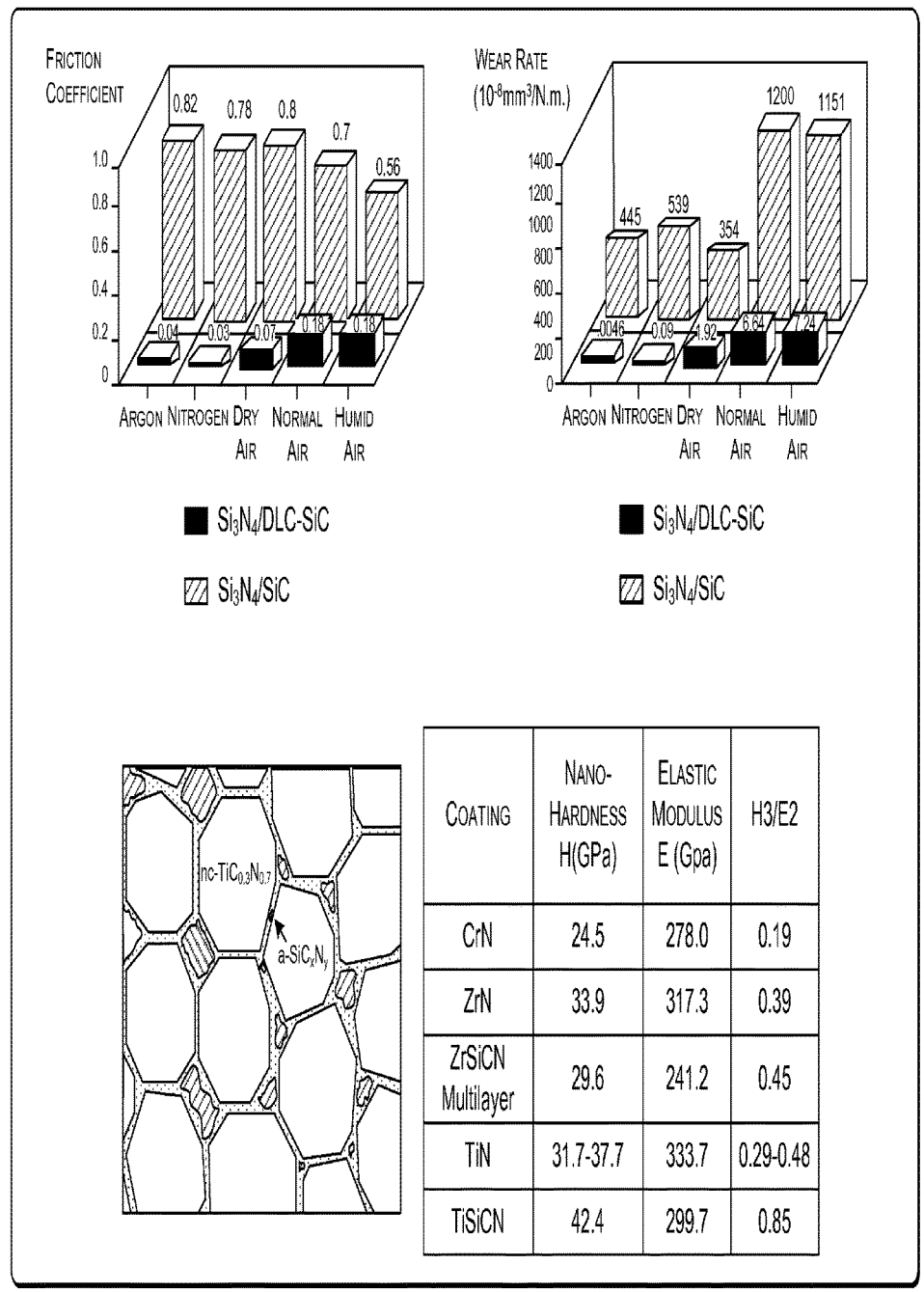
FIG. 11 is a diagram showing an example nanostructured surface or coating with nanovoids.

FIG. 11 shows the example nanostructured surface or coating with nanovoids (optionally filled with lubricants) comprising, for example, $Ti_xSi_yC_zN$, $Si_xC_yN_z$, $Si_xN_y$, and so forth. FIG. 11 shows example deposit chemistries, nanostructures, and properties. For example, TiSiCN exhibits high hardness, cracking resistance (H3/E2), and comprises nanovoids optionally capable of accommodating lubricants. The resulting friction coefficient is at least lower than that of conventional surfaces of face seals.

Figure 12:
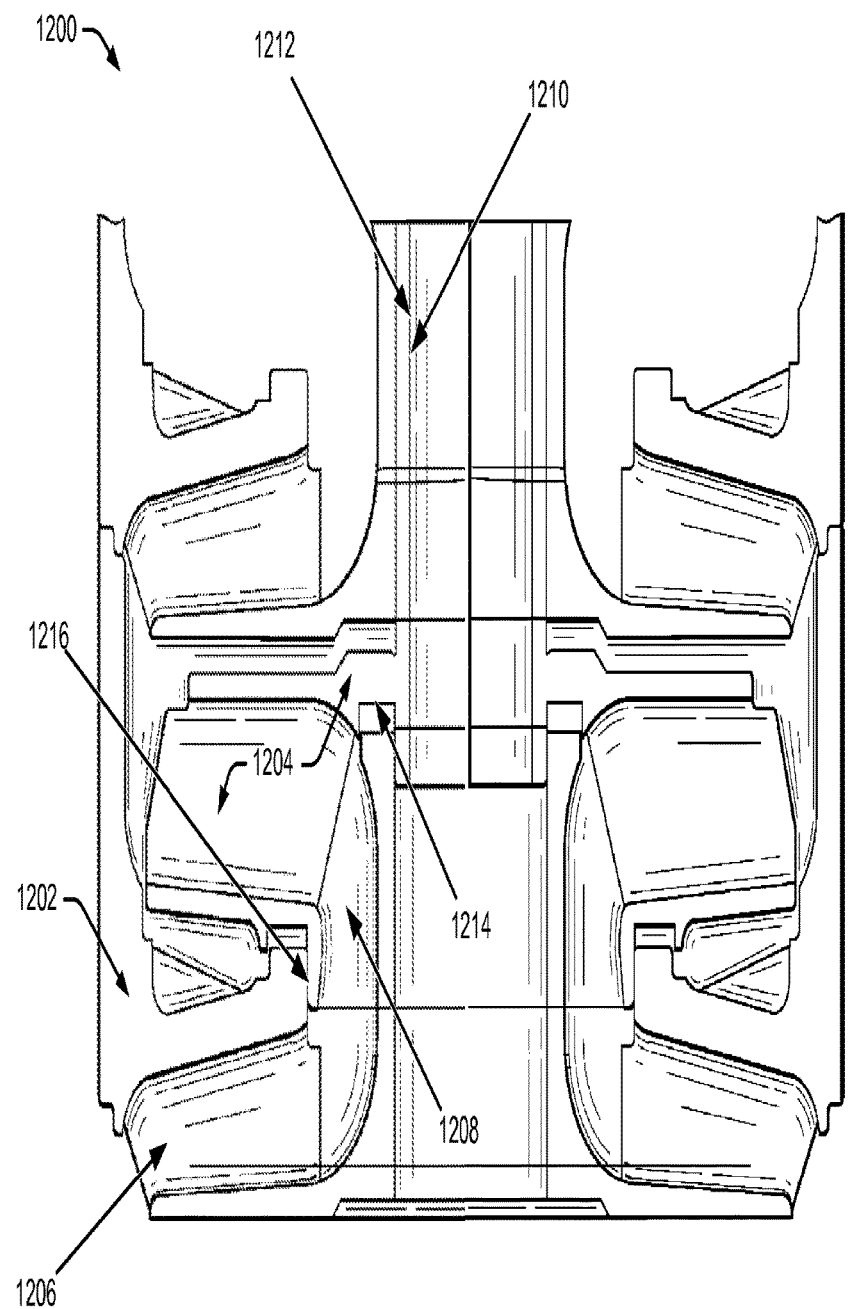
FIG. 12 is a diagram showing an example centrifugal pump stage of an ESP utilizing one or more example metallic nanostructured surfaces.

FIG. 12 shows an example centrifugal pump stage 1200 of an ESP. The centrifugal pump stage 1200 has stationary diffuser parts 1202 and rotating impeller parts 1204. A metallic nanostructured surface 102 may be applied at numerous places in the example centrifugal pump stage 1200. For example, unmoving hydraulic flow surfaces 1206 & 1208, which are part of the stationary diffuser 1202 within the centrifugal pump stage 1200, may be layered with a metallic nanostructured surface 102 to prevent erosion or abrasion from abrasive well fluid containing sand and particulates. The stage impellers 1204 and diffusers 1202 are subjected to abrasion from high velocity fluid flow containing particulates. An example ESP may have a partial or a total layering of metallic nanostructure 102 on all wet surfaces of each diffuser 1202 and impeller 1204.

A metallic nanostructured surface 102 may also be used on sliding surfaces of a central shaft 1210 and on bearing surfaces 1212 that support the central shaft 1210. A metallic nanostructured surface 102 may be used on both sides of a thrust bearing or thrust washer interface 1214 to reduce friction, wear, and operating temperature of the thrust washer interface 1214. The thrust washer bears the axial counter-load of the fluid thrust generated by the centrifugal pump stage 1200. The thrust washer itself may be attached to the stationary diffuser 1202 or to the rotating impeller 1204, depending on implementation. The thrust washer interface 1214 can be made up of a metallic nanostructured surface 102 on the stationary surface and a second metallic nanostructured surface 102 on the running surface of the thrust washer interface 1214. Metallic nanostructured surfaces 102 may also be applied to each side of a hydraulic clearance seal 1216 to prevent wear.

The illustrated locations for using a metallic nanostructured surface 102 in an example ESP and centrifugal pump stage 1200 are only examples. Many more surfaces in a pump stage or ESP can be protected by incorporating metallic nanostructured surfaces 102 to reduce friction, wear, and operating temperature. Thus, an example metallic nanostructured surface 102 can be located in many places in an example ESP. The example ESP includes locations and surfaces that are strategically coated with metallic nanostructured surface 102 to reduce abrasive wear and increase the life of the component or equipment.

Example Bearing Protection with Metallic Nanostructured Surfaces

A common failure mechanism in radial bearings of ESPs is due to wear. Abrasives in the well fluid environment can induce accelerated abrasive wear on the sliding surfaces of the bearings. In addition, friction and heat can reduce the ability of the fluid medium to lubricate the bearings.

Figure 13:
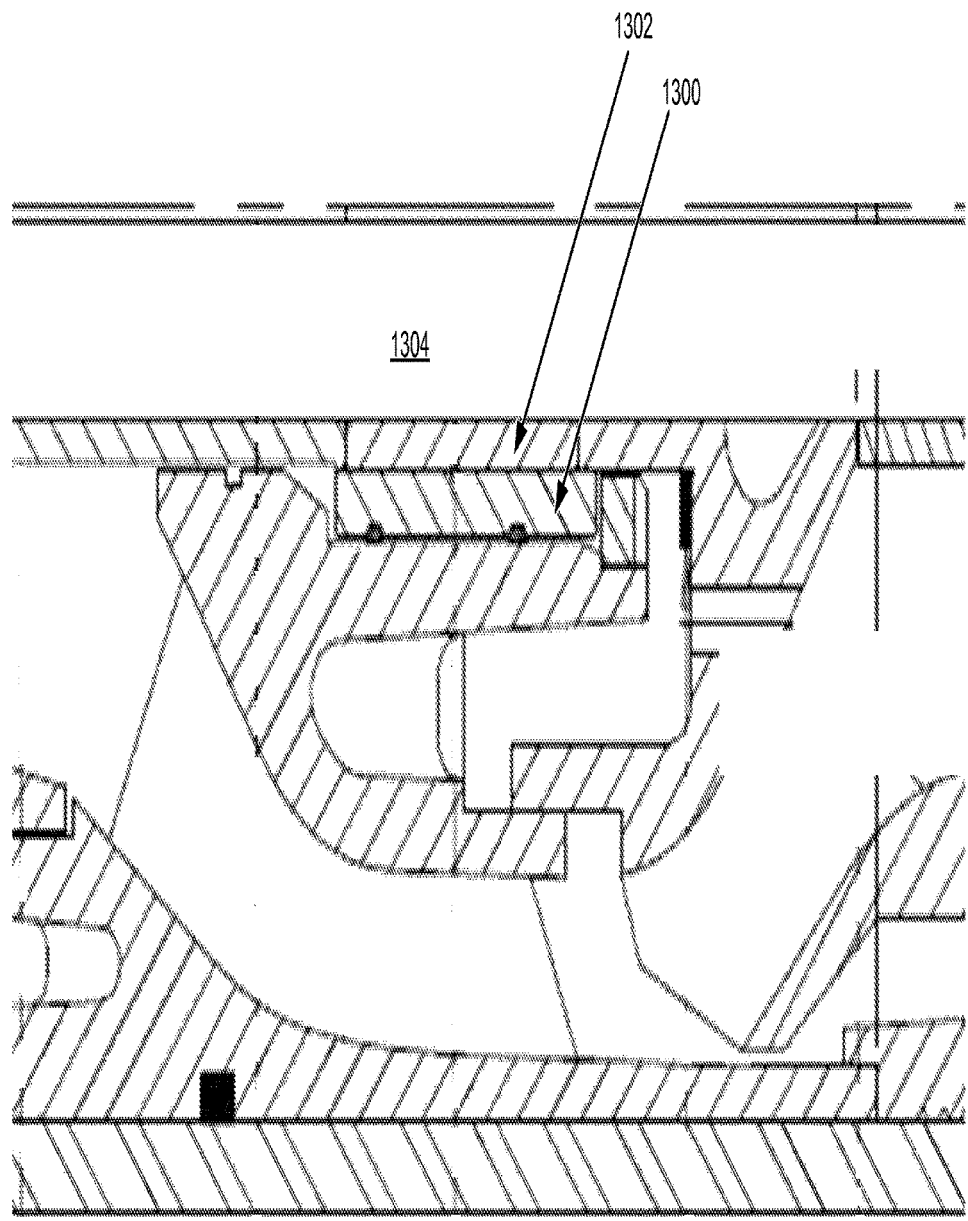
FIG. 13 is a diagram showing sliding surfaces of radial bearing with a metallic nanostructured surface or layer.

In FIG. 13, the sliding surfaces of radial bearings can greatly benefit from a metallic nanostructured surface 102 or layer. For example, a bearing bushing 1300 may be coated with a metallic nanostructured layer 102 on the surface that faces a bearing sleeve 1302, attached to a pump shaft 1304. These two surfaces move with respect to each other, and only the metallic nanostructured surfaces 102 wear on each other. Since the metallic nanostructured surface 102 is so hard, the lifespan of the bearing is greatly increased as the durability of the interface between the sliding surfaces of the bearing is greatly increased.

For a small shaft 1304 in an ESP, for example a shaft 1304 with a diameter no larger than approximately 0.8 inch in diameter, the two parts of a journal bearing, for example, can be made of metallic nanostructured material 102. For a larger shaft 1304, in an implementation, the radial bearing(s) can also be constructed of metallic nanostructured tiles 102 tiles attached to a metallic support, such as tungsten carbide (WC). This example scheme can be applied to most or all radial bearings inside an example ESP, including radial bearings in the pump, pump fluid intake, gas handler, gas separator, protector, shaft seal modules, motor, and so forth.

Example Thrust Bearing Protection with Nanostructured Surface

As described above for FIG. 12, a metallic nanostructured surface 102 may be used on both sides of a thrust bearing or thrust washer interface 1214 to reduce friction, wear, and operating temperature of the thrust washer interface 1214.

Figure 14:
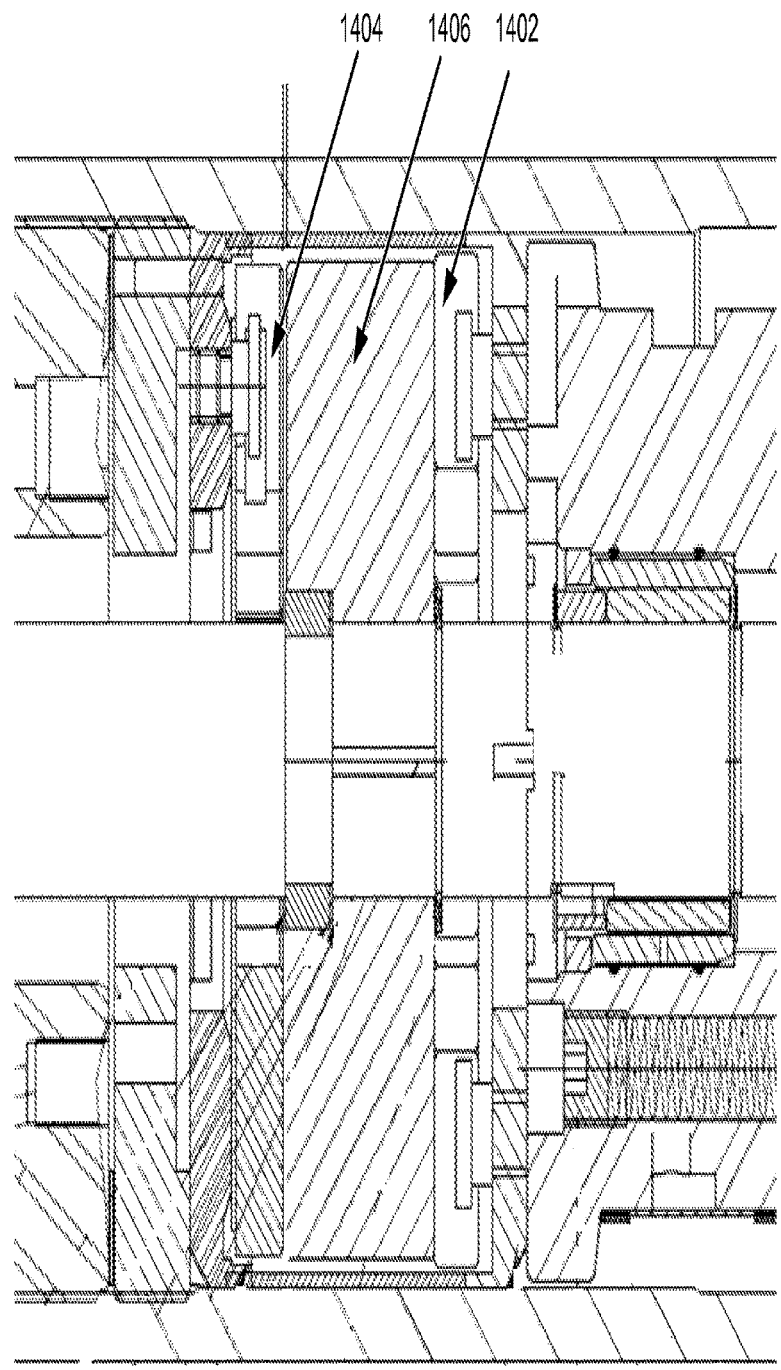
FIG. 14 is a diagram showing pump load transferred to different types of axial thrust bearings having a metallic nanostructured layer.

In FIG. 14, pump load is often transferred to different types of axial thrust bearings. There may be bearing downthrust pads 1402, bearing upthrust pads 1404, and a bearing runner 1406 in-between. The axial load on the pump impeller may reverse, thereby bringing the upthrust pads 1404 into play when the direction of rotation of the impeller reverses, or when there is inherent pressure in a reservoir that pushes fluid into a pump intake. Heavy-load thrust bearings 1402 are usually of the hydro-dynamic type with tilting pads, while low-load versions may be non-tilting. In both varieties, wear can be an issue especially when the lubricity between the sliding surfaces is lost. Having a metallic nanostructured layer 102 on the surfaces of the sliding parts reduces wear, friction and heat. The metallic nanostructured layer 102 can be applied on the running surfaces of the downthrust 1402 and upthrust pads 1404, as well as on the surfaces of the bearing runner 1406. Depending on the size of the sliding parts, these parts can be fabricated from solid metallic nanostructured materials 102 supported by tungsten carbide (WC) backing. The thrust bearing 1402 can also be fabricated by multiple flat metallic nanostructured (over WC) elements 102 sliding onto other similar elements. Such a bearing can operate in abrasive well-fluid.

Shaft Seals

Figure 15:
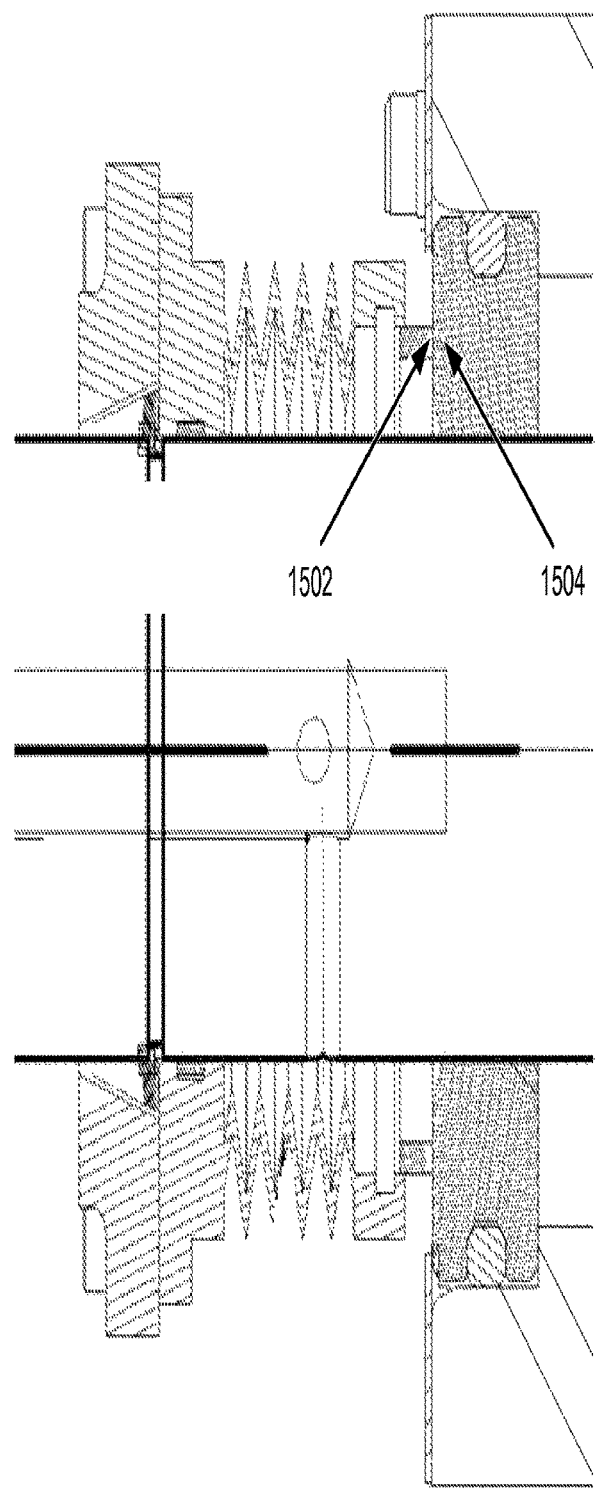
FIG. 15 is a diagram showing a shaft face seal with face surfaces protected by an example metallic nanostructured material.

As shown in FIG. 15, shaft seals feature a rotating face 1502 and a static face 1504 that slide against each other, not necessarily to bear a load, but to achieve a hydraulic seal, as also introduced in FIG. 1. The faces of the sliding surfaces 1502 & 1504 are often precision-lapped to achieve the best possible seal. These surfaces can be subject to sand particles in the lubricating environment that add to the sliding wear.

In FIG. 15, the use of metallic nanostructured materials 102 on ESP shaft seals can greatly improve their sealing capacity in terms of reduced wear, friction and temperature. In an implementation, the face-seals 1502 & 1504 can be made of metallic nanostructured materials 102. For small shaft diameter, each entire face seal can be made of metallic nanostructured material 102. For larger shaft, the face seal 1502 or 1504 can be made of a plate, such as a metallic nanostructured material 102 over tungsten carbide (WC) cut into a ring shape for the seal.

Figure 16:
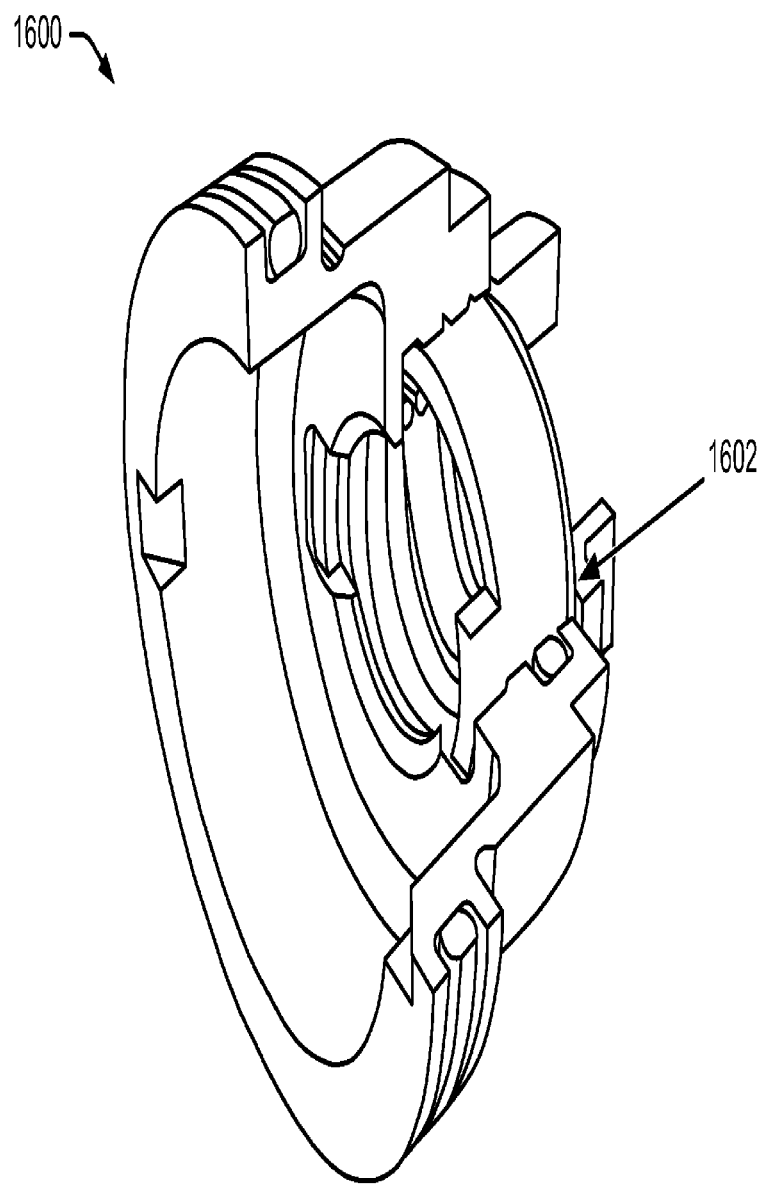
FIG. 16 is a diagram showing an example shaft face seal with components made at least in part from a carbide and coated with a metallic nanostructured material.
Figure 17:
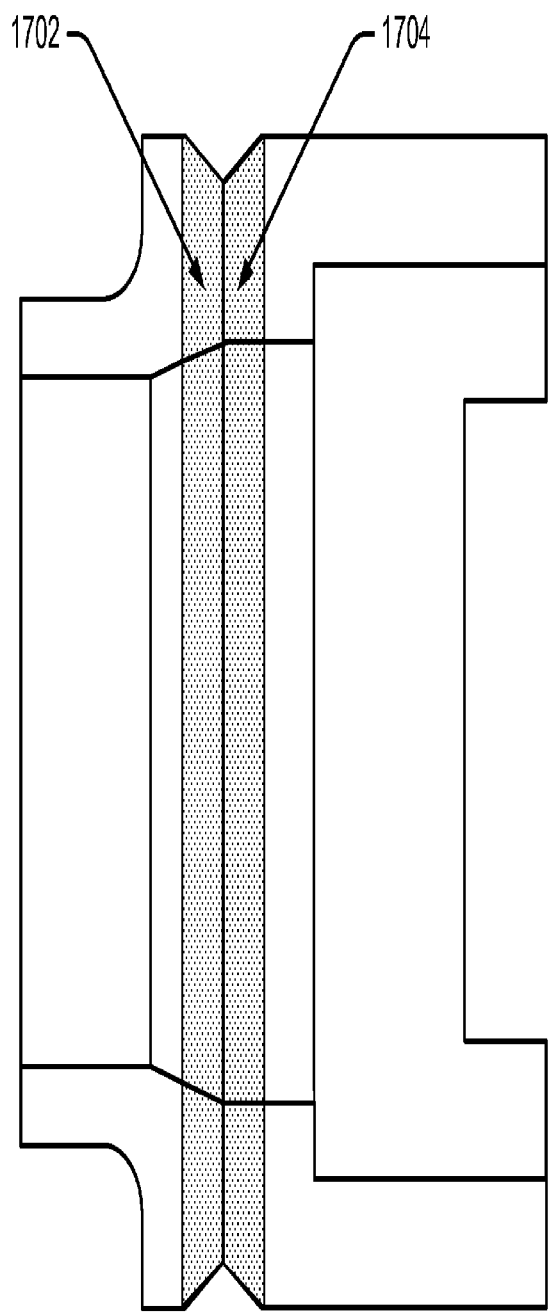
FIG. 17 is a diagram showing an example face seal with the sliding surfaces of the face seal replaced or layered with a metallic nanostructured surface.

FIG. 16 shows an example shaft seal 1600 that uses a face seal 1602. In an implementation, the shaft seal 1600 has face seal components that are made, at least in part, from a carbide, such as silicon carbide. These face seal surfaces are coated with a metallic nanostructured material 102.

FIG, 17 shows an implementation 1702, 1704 of the example face seal 1602 in FIG. 16. In an implementation, the sliding surfaces of the face seal 1602 are replaced or layered with a metallic nanostructured surface 102. In an implementation, metallic nanostructured surfaces 102 are sintered, deposited, plated, sputtered, etc., directly to a carbide surface of the face seal components, or, the face seal components themselves may be solid carbide, to which the metallic nanostructured layer 102 is sintered, deposited, sputtered, and so forth.

Figure 18:
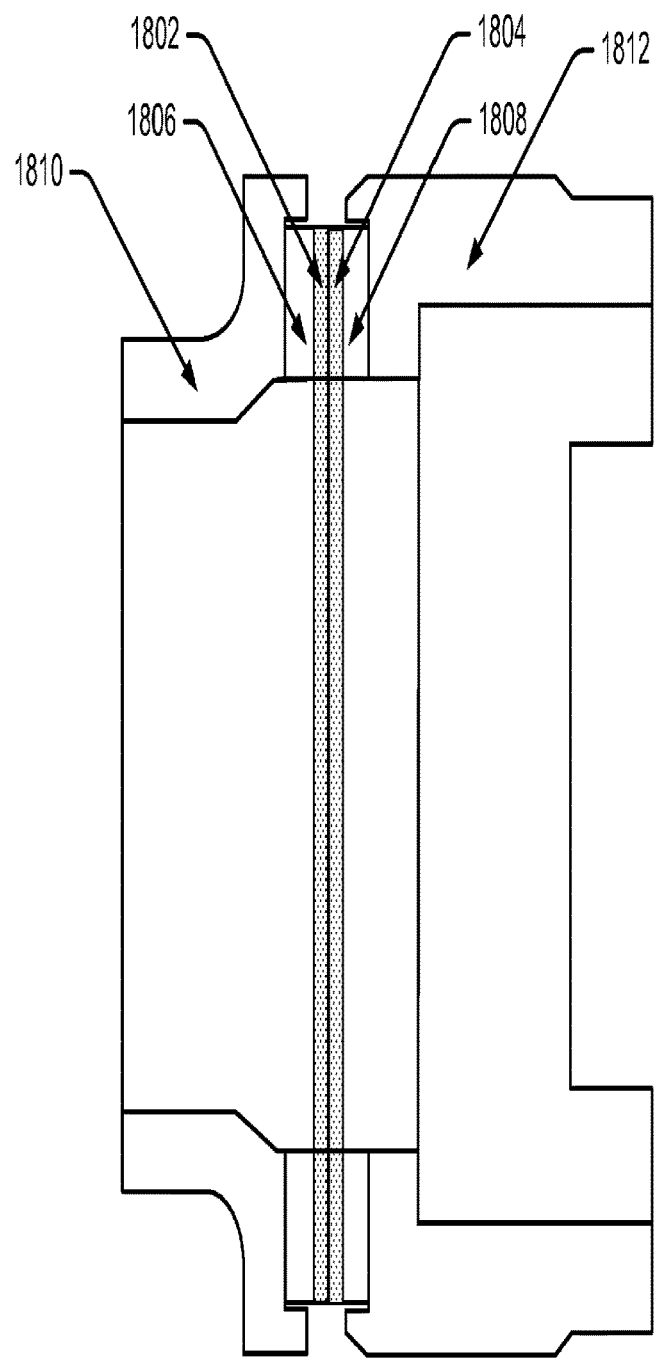
FIG. 18 is a diagram showing another example implementation of an example face seal with metallic nanostructured layers sintered to respective carbide pieces or supports and then brazed in turn onto a steel material of the face seal.

FIG. 18 shows another example implementation 1802 1804 of the example face seal 1602 in FIG. 16. In this implementation, the metallic nanostructured layers 102 are sintered to respective carbide pieces or supports 1806 & 1808, and then these are brazed in turn onto the steel material of the face seal components 1810 & 1812.

Hydraulic Seals

Figure 19:
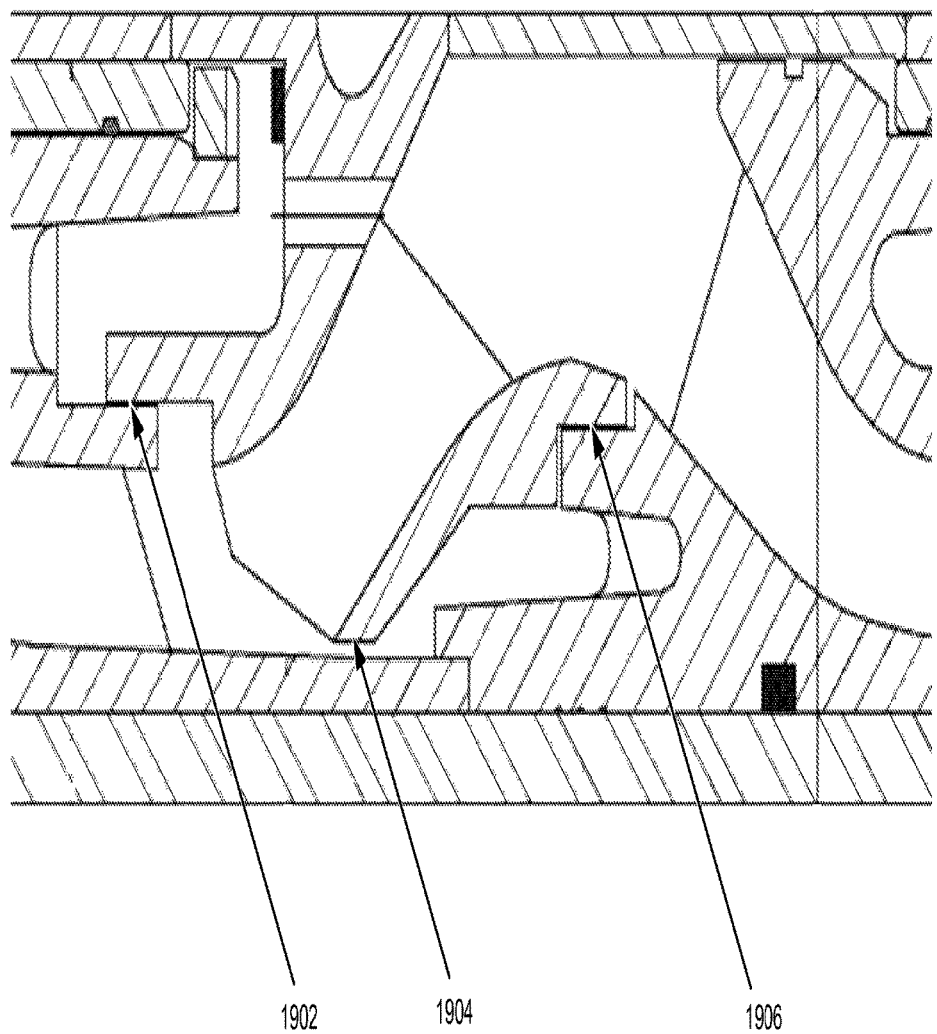
FIG. 19 is a diagram showing a pump interior in which various hydraulic seals between impellers and diffuser parts have metallic nanostructured layers applied.

Pump stage performance depends on the ability to route fluids through the appropriate pathways. FIG. 19 shows a pump interior in which various hydraulic seals (or clearance seals) 1902 & 1904 & 1906 between impellers and diffuser parts achieve fluid routing while controlling the amount of leak that goes through non-productive paths. In general, these hydraulic seals 1902 & 1904 & 1906 are created by having sliding surfaces with very small clearances between the rotating impeller and the stationary diffuser. The pumped fluid together with accompanying abrasive particles can create unwanted wear in the seal surface. A metallic nanostructured layer 102 can be applied to these seal surfaces during manufacture to reduce wear.

In a "floating" stage construction, each ESP impeller slides against its own thrust support. In such a design, the impeller thrust support can also act as a seal. Using a metallic nanostructured material 102 as a disk is beneficial for such design because the metallic nanostructured disk 102 can operate in well fluid, where the metallic nanostructured material 102 provides wear resistance and low friction-torque.

Pump Internal Passages & Wet Areas

Figure 20:
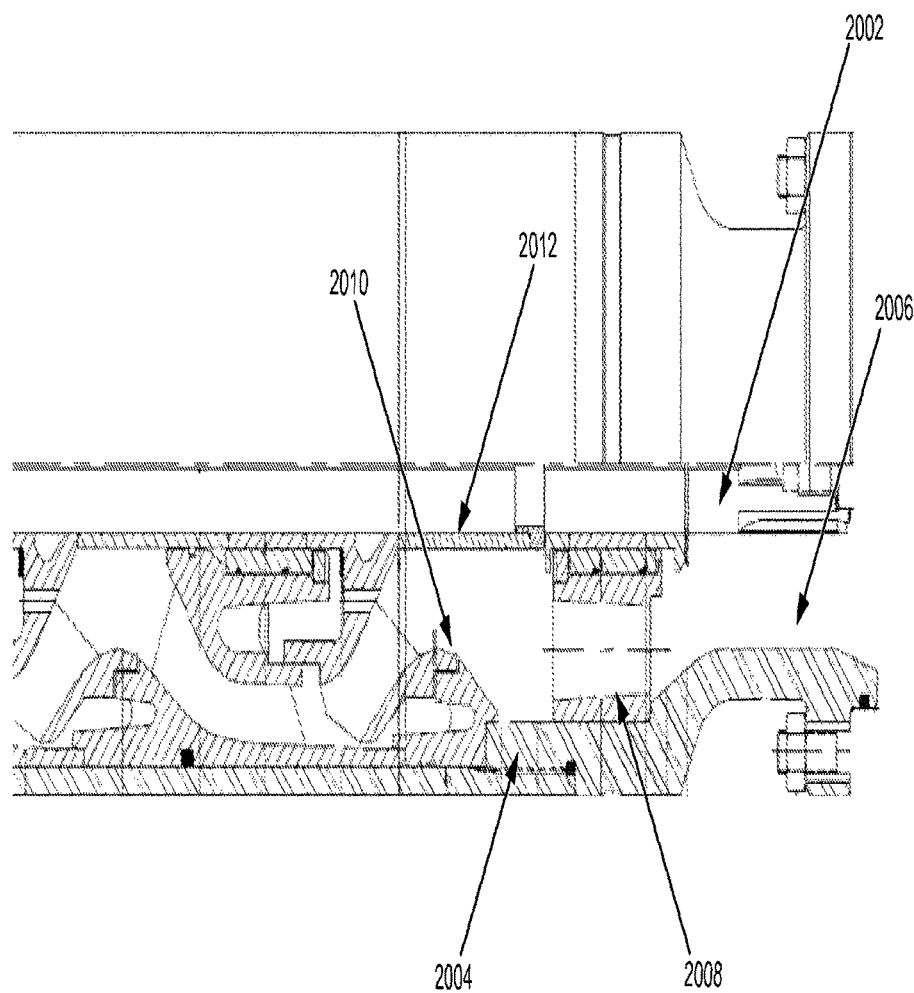
FIG. 20 is a diagram showing internal components inside a pump section of an ESP at least partly covered with a protective metallic nanostructured surface.
Figure 21:
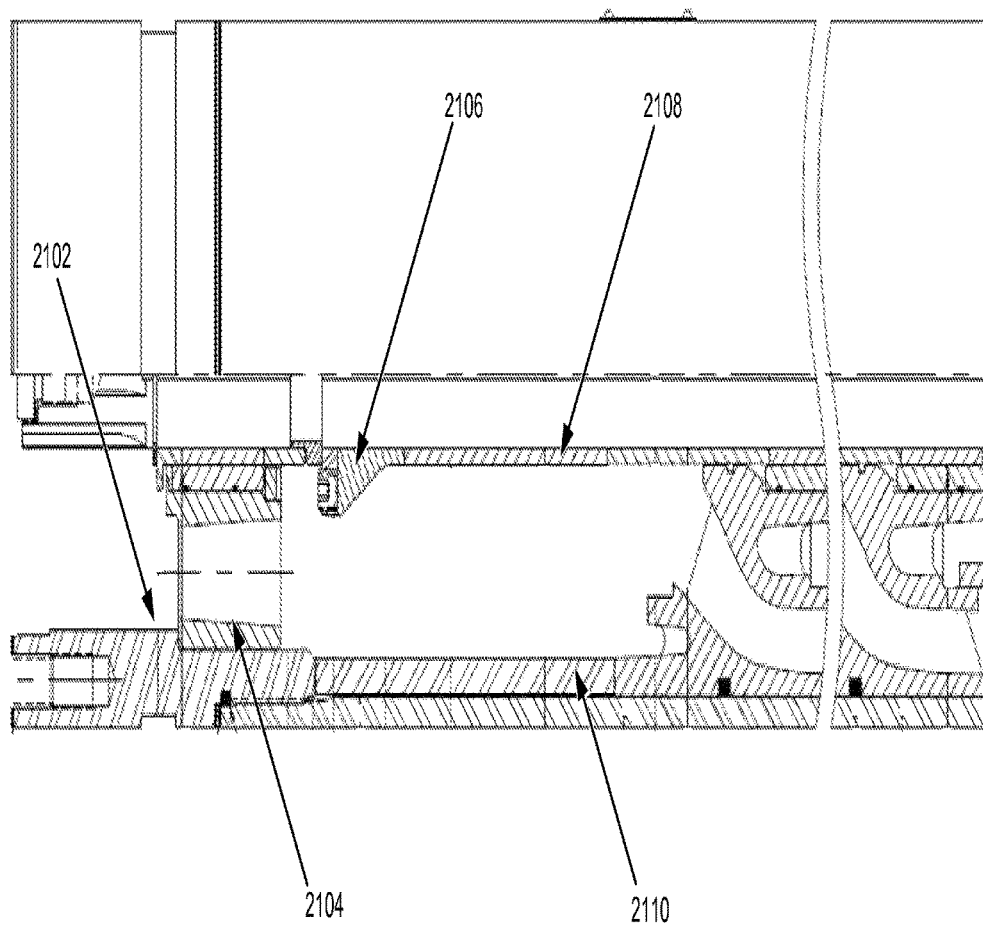
FIG. 21 is another diagram showing internal components inside a pump section of an ESP at least partly covered with a protective metallic nanostructured surface.

As shown in FIG. 20 and FIG. 21, there are other internal components inside a pump section of an ESP that are subjected to produced fluid flow and that can wear over time. Examples of these components that can be at least partly covered with a protective metallic nanostructured surface 102 are spaces and cavities in the pump, shafts 2002, pump heads 2102, pump bases 2004, flange areas 2006, bearing supports 2008 & 2104, flow directors 2010 & 2106, spacers 2012 & 2108 & 2110, and so forth.

Pump Intakes

Figure 22:
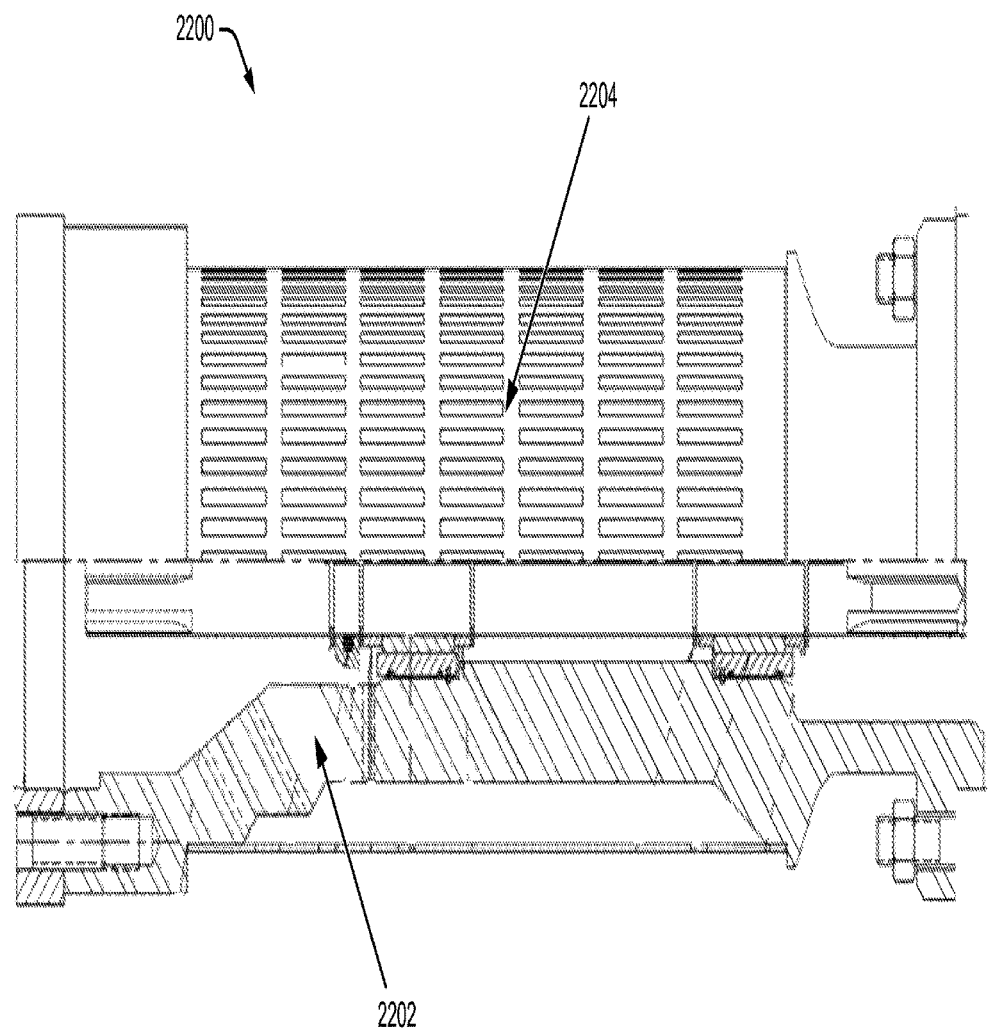
FIG. 22 is a diagram showing a pump intake with metallic nanostructured coatings throughout the inlet locations.

In FIG. 22, the pump intake 2200 (or gas separator, handler) is subjected to internal flow similar to that of the pump but, in addition, the intake 2200 can also have localized high-velocity flow on the inlet ports 2202. Metallic nanostructured coatings 102 throughout the inlet locations, on both the interior and exterior of the intake 2200, for example on the inlet ports 2202 and on the interior and exterior of the screen 2204, are beneficial to reduce wear of these components.

Example Method

Figure 23:
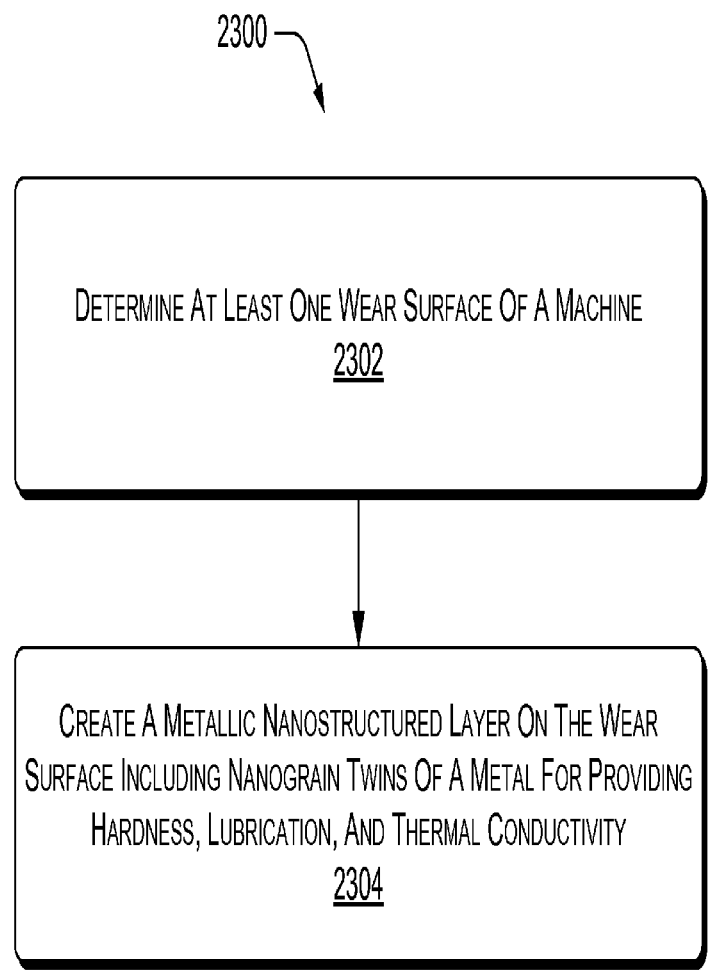
FIG. 23 is a flow diagram of an example method of protecting areas of wear in an ESP with a metallic nanostructured surface.

FIG. 23 shows an example method 2300 of protecting a machine surface from wear. In FIG. 23, operations of the example method 2300 are described in blocks.

At block 2302, at least one wear surface of the machine is determined. For example, the wear surface may be a face seal, a bushing, a bearing, a thrust member, a fluid-facing surface, or a hydraulic flow passage of an electric submersible pump (ESP).

At block 2304, a metallic nanostructured layer is created on the surface including nanograins and nanograin twins of a metal for providing hardness, lubrication, and thermal conductivity. The metallic nanostructured layer provides fracture-resistant hardness that may exceed that of a diamond-like carbon coating or a carbide, and provides built-in lubrication and/or a surface for infusing a lubricant, and also provides thermal conductivity for conducting away heat caused by friction.

CONCLUSION

Although only a few example embodiments have been described in detail above, those skilled in the art will readily appreciate that many modifications are possible in the example embodiments without materially departing from the subject matter. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. An apparatus, comprising:
   a machine component;
   a surface of the machine component subject to wear, and
   a metallic nanostructure on the surface to resist the wear and to provide a hardness, a lubrication, and a thermal conductivity to the surface, wherein the metallic nanostructure comprises a nanocrystalline alloy including twins of metallic nanocrystals.

2. The apparatus of claim 1, wherein the entire machine component comprises the metallic nanostructure.

3. The apparatus of claim 1, wherein the metallic nanostructure is disposed on the surface by one of deposition, electrolysis, sputtering, plating, electroplating, or coating.

4. The apparatus of claim 1, wherein the machine component comprises one of a face seal, a bushing, a bearing, a thrust member, a fluid-facing surface, or a hydraulic flow passage of an electric submersible pump.

5. The apparatus of claim 1, wherein the metallic nanostructure comprises a thickness of one of approximately a micron thick, approximately a millimeter thick, approximately a centimeter thick, or a thickness replacing the entire machine component.

6. The apparatus of claim 1, wherein the twins comprise icosahedral twins of metallic crystals of a body-centered cubic (BCC), a face-centered cubic (FCC), or a hexagonal closest packed (HCP) crystal system.

7. The apparatus of claim 1, wherein the metallic nanostructure comprises an alloy of one of copper, silver, gold, iron, nickel, palladium, platinum, rhodium, beryllium, magnesium, titanium, zirconium, or cobalt.

8. The apparatus of claim 1, wherein the metallic nanostructure comprises an alloy of copper, nickel, or tin.

9. The apparatus of claim 1, wherein the metallic nanostructure comprises a metal selected from the group consisting of nickel, cobalt, and iron as a main chemical element complemented by an alloying element selected from the group consisting of silicon, molybdenum, tungsten, lead, tin, indium, silver, and carbon.

10. The apparatus of claim 1, wherein the metallic nanostructure is partially crystalline, partially amorphous, and comprises a metallic glassy alloy or a diamond-like carbon (DLC) coating having various fractions of sp2 and sp3 orbital bonds.

11. The apparatus of claim 1, wherein the metallic nanostructure includes nanostructured or twinned boron nitride in cubic or hexagonal form.

12. The apparatus of claim 1, wherein the metallic nanostructure comprises nano-size metallic grains and atomic layer thick ceramics.

13. The apparatus of claim 1, wherein the metallic nanostructure comprises aluminum nitride surrounding nano-size grain aluminum.

14. The apparatus of claim 1, wherein the metallic nanostructure is infused with a liquid lubricant or a nanosized solid lubricant selected from the group consisting of molybdenum disulfide ($MoS_2$), tungsten disulfide ($WS_2$), hexagonal-boron nitride (hBN), graphite, diamond, and graphene.

15. The apparatus of claim 1, wherein the metallic nanostructure is hydrophobic and/or oleophilic to enhance lubricity and improve a water-sealing performance.

16. The apparatus of claim 15, wherein a surface chemical property of the metallic nanostructure is determined by a surface texturization at a nanoscale level.

17. The apparatus of claim 1, wherein the metallic nanostructure comprises one of $Ti_xSi_yC_zN$, $Si_xC_yN_z$, or $Si_xN_y$ having nanovoids formed therebetween.

18. The apparatus of claim 17, wherein the nanovoids are filled with a lubricant.

19. A system, comprising:
   an electric submersible pump;
   a component of the electric submersible pump subject to wear; and
   a metallic nanostructured surface of the component for resisting the wear by providing a hardness, a lubrication, and a thermal conductivity to the component, wherein the metallic nanostructured surface comprises a nanocrystalline alloy including nanograin twins of metallic crystals of a body-centered cubic (BCC), a face-centered cubic (FCC), or a hexagonal closest packed (HCP) crystal system of at least one metal.

20. The system of claim 19, wherein the component comprises one of a face seal, a bushing, a bearing, a thrust member, a fluid-facing surface, or a hydraulic flow passage of the electric submersible pump.

21. The system of claim 19, wherein the metallic nanostructured surface comprises an alloy of one of copper, silver, gold, iron, nickel, palladium, platinum, rhodium, beryllium, magnesium, titanium, zirconium, or cobalt.

22. The system of claim 19, wherein the metallic nanostructured surface comprises an alloy of copper, nickel, or tin.

23. The system of claim 19, wherein the metallic nanostructured surface comprises a metal selected from the group consisting of nickel, cobalt, and iron as a main chemical element complemented by an alloying element selected from the group consisting of silicon, molybdenum, tungsten, lead, tin, indium, silver, and carbon.

24. The system of claim 19, wherein the metallic nanostructured surface includes twinned boron nitride in cubic or hexagonal form.

25. The system of claim 19, wherein the metallic nanostructured surface comprises nano-size metallic grains and atomic layer thick ceramics.

26. The system of claim 19, wherein the metallic nanostructured surface comprises aluminum nitride surrounding nano-size grain aluminum.

27. The system of claim 19, wherein the metallic nanostructured surface is infused with a liquid lubricant or a nanosized solid lubricant selected from the group consisting of molybdenum disulfide ($MoS_2$), tungsten disulfide ($WS_2$), hexagonal-boron nitride (hBN), graphite, diamond, and graphene.

28. A method, comprising:
determining at least one wear surface of an electric submersible pump; and
creating a metallic nanostructured layer on the at least one wear surface including nanograins and nanograin twins of a metal for providing a hardness, a lubrication, and a thermal conductivity to the at least one wear surface.

29. An apparatus, comprising:
a machine component;
a surface of the machine component subject to wear; and
a metallic nanostructure on the surface to resist the wear and to provide a hardness, a lubrication, and a thermal conductivity to the surface, wherein the metallic nanostructure comprises nano-size metallic grains and atomic layer thick ceramics.

30. An apparatus, comprising:
a machine component;
a surface of the machine component subject to wear; and
a metallic nanostructure on the surface to resist the wear and to provide a hardness, a lubrication, and a thermal conductivity to the surface, wherein the metallic nanostructure comprises aluminum nitride surrounding nano-size grain aluminum.

* * * * *